United States Patent [19]
Jain et al.

[11] Patent Number: 6,121,969
[45] Date of Patent: Sep. 19, 2000

[54] VISUAL NAVIGATION IN PERCEPTUAL DATABASES

[75] Inventors: Ramesh Jain, San Diego; Simone Santini, La Jolla, both of Calif.

[73] Assignee: The Regents of the University of California, Oakland, Calif.

[21] Appl. No.: 08/902,493

[22] Filed: Jul. 29, 1997

[51] Int. Cl.$^7$ .............................. G06F 17/30; G06F 3/14
[52] U.S. Cl. .............................. 345/355; 707/6; 382/305
[58] Field of Search .................................. 345/355, 356, 345/357, 419, 427, 440, 968, 348, 339; 707/2, 5, 6, 4, 7, 104; 382/165, 209, 218, 220, 305

[56] References Cited

U.S. PATENT DOCUMENTS

| | | | |
|---|---|---|---|
| 5,579,471 | 11/1996 | Barber et al. | 345/326 |
| 5,636,350 | 6/1997 | Eick et al. | 345/440 |
| 5,751,286 | 5/1998 | Barber et al. | 345/348 |
| 5,847,708 | 12/1998 | Wolff | 345/349 |
| 5,886,698 | 3/1999 | Sciammarella et al. | 345/349 |
| 5,893,095 | 4/1999 | Jain et al. | 707/6 |

OTHER PUBLICATIONS

Campanai et al., "Using 3D Spatial Relationships for Image Retrieval by Contents", 1992 IEEE Workshop on Visual Language Proceedings, pp. 184–190, Sep. 1992.

*Primary Examiner*—Crescelle N. de la Torre
*Attorney, Agent, or Firm*—Fuess & Davidenas

[57] ABSTRACT

A similarity-based database of images, where images are preferably ranked and correlated in correspondence to biological preattentive similarity, supports a new type of interface for visual navigation within the database to the end that a human may perceive not only selected images resultant from a query, but the relationship between the selected images. In particular, navigation is within a display space whose geometric characteristics depend on the geometry of the perceptual space in which image similarity is measured. The display space is a subset of the three dimensional Euclidean space that, for many of the distance functions appropriate to the images, is contained in the unit cube. The perceptual intuition of the metric is given (i) in part by the distribution of images in the space, and (ii) in part by making the motion of the user uniform with respect to the metric of the space.

14 Claims, 10 Drawing Sheets

VISUAL NAVIGATION IN PERCEPTUAL DATABASES

BACKGROUND OF THE INVENTION

1. Field of the Invention

The present invention generally concerns information visualization, and interactive techniques and interactive environments for the manipulation of images and image data in computers.

The present invention more specifically concerns (i) particular orderings of image databases in which images are searched by their perceptual characteristics—called perceptual databases—and (ii) particular metrics and methods for a man-computer interface—called a "display space"—in which a user may navigate among the (ordered) images of the (perpetual) database, and among the results of computerized searches of the images of the (perceptual) database.

2. Description of the Prior Art 2.1 Background References to the Explanation of the Invention The present specification makes abundant reference to certain papers and textbooks that also form the most pertinent prior art to the present invention. In to make convenient the frequent citation of these references hereinafter this SUMMARY OF THE INVENTION section, and also within the DESCRIPTION OF THE PREFERRED EMBODIMENT, of this specification, the references are first listed in this section 2.1.

(Note that, of the following references, references "Santini 96a", "Santini 96b", "Santini 96c" and "Santini 97a"—some of which have not yet appeared in printed form, but are at the time of the filing of this specification slated for publication—are the inventor's own work, and are thus not prior art. These references are included in the present and following sections so that they may be optimally current and comprehensive.)

Reference "Ashby 88" is F. Gregory Ashby and Nancy A. Perrin. Toward a unified theory of similarity and recognition. Psychological Review, 95(1): 124–150, 1988.

Reference "Beck 82" is J. Beck. Textural segmentation. In J. Beck, editor, Organization and representation in perception. Erlbaum, 1982.

Reference "Boothby 75", is William M. Boothby. An Introduction to Differential Manifolds and Riemannian Geometry. Pure and Applied Mathematics. Academic Press, 1975.

Reference "Bruce 85" is Vicki Bruce and Patrick Green. Visual Perception: Physiology, Psychology, and Ecology. Lawrence Erlbaum Associates, 1985.

Reference "Chang 95" is Shih Fu Chang and John R. Smith. Extracting multi-dimensional signal features for content-based visual query. In SPIE Symposium on Communications and Signal Processing. 1995.

Reference "Chen 96" is H. Chen, B. Schatz, T. Ng, J. Martinez, A. Kirchoff, and C. Lin. A parallel computing approach to creating engineering concept spaces for semantic retrieval: The Illinois digital library initiative project. IEEE Transactions on Pattern Analysis and Machine Intelligence, 18(8), August 1996.

Reference "Flicker 95" is Myron Flickner, Harpreet Sawhney, Wayne Niblack, Jonathan Ashley, Qian Huan, Byron Dom, Monika Gorkani, Jim Hafner, Denis Lee, Dragutin Petkovic, David Steele, and Peter Yanker. Query by image and video content: The QBIC system. IEEE Computer, 1995.

Reference "Hailman 77" is J. P. Hailman. Optical Signals: Animal communication and light. Indiana University Press, 1977.

Reference "Alston 45" is Alston S. Householder and Herbert D. Landahl. Mathematical biophysics of the central nervous system. Principia Press, Bloomington, Inc., 1945.

Reference "Hsu 96" is Chih-Cheng Hsu, Wesley W. Chu, and Ricky K. Taira. A knowledge-based approach for retrieving images by content. IEEE Transactions on Pattern Analysis and Machine Intelligence, 8(4): 522–532, August 1996.

Reference "Hubel 67" is D. H. Hubel and T. N. Wiesel. Receptive fields and functional architecture of monkey striate cortex. Journal of Physiology (London), 195, 1967.

Reference "Idris 95" is F. Idris and S. Panchanathan. Image indexing using wavelet vector quantization. In Proceedings of the SPIE Vol. 2606-Digital Image Storage and Archiving Systems, Philadelphia, Pa., USA, 25–26 October, pages 269–275. 1995.

Reference "Jacobs 95" is Charles E. Jacobs, Adam Finkelstein, and Savid H. Salesin. Fast multiresolution image querying. In Proceedings of SIGGRAPH 95, Los Angeles, Calif. ACM SIGGRAPH, New York, 1995.

Reference "Krumhansl 78" is Carol L. Krumhansl. Concerning the applicability of geometric models to similarity data: The interrelationship between similarity and spatial density. Psychological Review, 85: 445–463., 1978.

Reference "Lovelock 89" is D. Lovelock and H. Rund. Tensors, Differential Forms, and Variational Principles. Dover Books on Advanced Mathematics, 63. Dover Publications, Inc., New York, 1975, 1989.

Reference "Malik 90" is Jitendra Malik and Pietro Perona. Preattentive texture discrimination with early vision mechanisms. Journal of the Optical Society of America A, 7(5), 1990.

Reference "Mason 91" is Carol Mason and Eric R. Kandel. Central visual pathways. In Eric R. Kandel, James H. Schwartz, and Thomas M. Jessell, editors, Principles of Neural Science, chapter 30, pages 420–439. Appleton & Lange, 1991.

Reference "Nabil 96" is Mohammad Nabil, Anne H. H. Ngu, and John Sheperd. Picture similarity retrieval using the 2D projection interval representation. IEEE Transaction on Knowledge and Data Engineering, 8(4): 533–539, August 1996.

Reference "Okubo 87" is T. Okubo. Differential Geometry. Monographs and Textbooks in pure and applied mathematics. Marcel Dekker, Inc., 270 Madison Ave., New York 10016, 1987.

Reference "Olson 70" is R. R. Olson and F. Attneave. What variables produce similarity grouping? American Journal of Psychology, 83: 121, 1970.

Reference "Pentland 94" is A. Pentland, R. W. Picard, and S. Sclaroff. Photobook: Tools for content-based manipulation of image databases. In SPIE Conference on Storage and Retrieval of Images and Video Databases II, Volume 2185. San Jose, Calif., February 1994.

Reference "Santini 95" is Simone Santini and Ramesh Jain. Similarity matching. IEEE Transactions on Pattern Analysis and Machine Intelligence, 1995. (Submitted).

Reference "Santini 96a" is Simone Santini and Ramesh Jain. Gabor space and the development of preattentive similarity. In International Conference on Pattern Recognition, Vienna, 1996. Available at http://www-cse.uscd.edu/users/ssantini.

Reference "Santini 96b" is Simone Santini and Ramesh Jain. Similarity queries in image databases. In Proceedings of CVPR '96, International IEEE Computer Vision and Pattern Recognition Conference, 1996.

Reference "Santini 96c" is Simone Santini and Ramesh Jain. The graphical specification of similarity queries. Journal of Visual Languages and Computing, 1997 (to appear). Available at http://www-cse.ucsd.edu/users/ssantini.

Reference "Santini 97a" is Simone Santini and Ramesh Jain. Similarity is a geometer. Multimedia Tools and Applications, 1997 (to appear). Available at http://www-cse.ucsd.edu/users/ssantini.

Reference "Sawhney 96" is H. Sawhney and S. Ayer. Compact representation of videos through dominant and multiple motion estimation. IEEE Transactions on Pattern Analysis and Machine Intelligence, 18(8), August 1996.

Reference "Shapley 90" is Robert Shapley, Terrence Caelli, Stephen Grossberg, Michael Morgan, and Ingo Rentschler. Computational theories of visual perception. In Lothar Spillman and John S. Werner, editors, Visual Perception: The Neurophysiological Foundation, pages 417–448. Academic Press, 1990.

Reference "Shepard 87" is Roger N. Shepard. Toward a universal law of generalization for physical science. Science, 237: 1317–1323, 1987.

Reference "Stark 95a" is Hans-Georg Stark and Gernod P. Laufkotter. Image indexing and content based access to databases of medical images and wavelets. In Proceedings of the SPIE Vol. 2569-Wavelet Applications in Signal and Image Processing III, San Diego, Calif., USA, 12–14 July, pages 790–800, 1995.

Reference "Treisman 86" is A. Treisman. Features and objects in visual processing. Scientific American, 255: 114B–125, 1986.

Reference "Treisman 87" is A. Treisman. Properties, parts, and objects. In. K. R. Boff, L. Kaufman, and J. P. Thomas, editors, Handbook of Perception and Human Performance. Wiley, 1987.

Reference "Tversky 77" is Amos Tversky. Features of similarity. Psychological Review, 84(4): 327–352, July 1977.

Reference "Tversky 70" is Amos Tversky and David H. Krantz. The dimensional representation and the metric structure of similarity data. Journal of Mathematical Psychology, 7: 572–597, 1970.

Reference "Van Essen 84" is David C. Van Essen and H. R. Newsome, William T. and Maunsell. The visual field representation in striate cortex of the macaque monkey: Asymmetries, anisotropies, and individual variability. Vision Research, 24(5): 429–448, 1984.

Reference "Warner 94" is Frank W. Warner. Foundations of Differential Manifolds and Lie Groups. Graduate Texts in Mathematics, 94. Springer-Verlag, 1983.

Reference "Wilson 96" is Hugh R. Wilson, Dennis Levi, Lamberto Maffei, Jyrki Rovamo, and Russel DeValois. The perception of form, retina to striate cortex. In Lothar Spillman and John S. Werner, editors, Visual Perception: The Neurophysiological Foundation. Academic Press, 1990.

Reference "Yao 79" is Christopher H. Yeo. The anatomy of the vertebrate nervous system: an evolutionary and developmental perspective. In David A. Oakley and H. C. Plotkin, editors, Brain, Behavior, and Evolution, pages 28–51. Methuen, London, 1979.

2.1 General Background, Including Background in Biologic Systems, to the Concepts of the Present Invention The present invention will shortly be seen to concern certain new constructs for similarity-based image databases, and a new type of man-machine (man-computer) interface for navigation in a database of images.

"Image databases" are databases in which images are searched through their perceptual characteristics. These databases operate directly on the image data, and require no encoding or labeling by an operator. "Perceptual databases" based on this idea, or on similar ideas, which we call perceptual databases, have received a lot of attention circa 1997. Reference, for example, Pentland 94, Stark 95a, Idris 95, Jacobs 95, Flicker 95, Chang 95a, Nabil 96, Hsu 96, Chen 96, and Sawhney 96.

Working with perceptual data requires rethinking and re-analyzing many aspects of database organization that are usually taken for granted. Reference, for example, Santini 95, Santini 96a, Santini 96b, Santini 97a.

In particular, the historically fundamental operation in databases, the matching of a database item against a query, loses meaning at the perceptual level, and therefore image databases should not use it. Reference Santini 96a, Santini 96b, Santini 96c, and Santini 97a.

How are searches to be made in a database if things cannot be matched? It is one insight of the present invention that modern computer scientists may not be the first organisms in the history of planet earth looking for this answer. Many primitive animals that lacked a nervous system extended enough to sustain complex perception and categorization faced the same problem a few hundred millions years ago. The way biological evolution solved the problem is simple: instead of extracting and matching meanings, animals came to look for generic perceptual similarities between images. Reference Hailman 77 and Bruce 85.

Accordingly, the present invention finds it useful (i) to organize, and (ii) to interrogate, image databases to the same end. Rather than trying to give all possible meanings to an image—which is impossible even for humans—databases should be (i) organized and (ii) presented (which are separate, but related, things) so as to rely on simple perceptual cues, and on a reasonable similarity measures.

As an aside, and in order to illustrate by example the complexity of ascribing meaning to an image, consider the (real) example of a picture of Stalin in the 1920's on a podium. This picture happened to be a picture of Trotsky standing with Stalin at a rally, but Trotsky had later been "removed" for propaganda reasons. Sometimes the information is not in what's in the picture, but in what isn't in the picture.

The real moment of this example—which may seem excessively subtle and arcane in illustration of the simple truth that it is difficult to describe images in words ("one picture is worth a thousand words")—will only later be brought home in this specification: it will later be explained that the incongruity of this very picture might (when co-located among others) prove to be detectable and perceivable (to an otherwise unknowing human) by the action of the methods of the present invention. To locate and to distinguish "what is not there" is, with all due modesty, "quite a trick". The promise of even this (minor, narrow) aspect of the present invention alone should pique the interest of the reader.

Continuing with biological "clues" to the organization of visual databases, it is the contention of the present invention that such databases should not try to recognize objects in the image, nor even attempt object segmentation, but should instead rely on a naive and acritical observation of the patterns of color and intensity in the image.

This kind of visual data assimilation and processing is common in animals, especially animals without a sophisticated central nervous system. Rudimentary as it may be, it has proven surprisingly effective in support of the necessities of these animals' life on earth. It corresponds roughly to what in humans is known as preattentive similarity. Reference Malik 90, Treisman 86, Treisman 87, Beck 82.

2.2 Specific Background to the Present Invention Re: Conceptual Databases

The displays of the present invention—mainstay of most of its aspects—are not known by the inventors to exist, nor to be analogous, to anything in the prior art not already discussed. However, the sophisticated manner in which the present invention orders, as well as selects, the objects of a computerized search may be compared to certain patented inventions within the prior art. Although the present invention does not concern artificial intelligence, this prior art is often in the area of artificial intelligence.

U.S. Pat. No. 4,899,290 to Hartzband for a SYSTEM FOR SPECIFYING AND EXECUTING PROTOCOLS FOR USING ITERATIVE ANALOGY AND COMPARATIVE INDUCTION IN A MODEL-BASED COMPUTATION SYSTEM. This patent, assigned to Digital Equipment Corporation (Maynard, Mass.) concerns a system for performing iterative specialization and iterative generalization among objects in a set. Initially, an analogy or symmetric comparison operation is performed between a predetermined pair of objects to determine the similarities (and differences if symmetric comparison is performed) between the objects, and to generate respective similarity and difference reference structures. The system then iteratively performs analog or symmetric comparison operations using the previously generated reference structures and the reference structure of the object being processed during the iteration to determine the similarity of difference between the object and the previously determined reference structure.

U.S. Pat. No. 5,267,329 to Ulich, et. al. for a PROCESS FOR AUTOMATICALLY DETECTING AND LOCATING A TARGET FROM A PLURALITY OF TWO DIMENSIONAL IMAGES is concerned with the quality of image classification, as is the present invention. However, the classification is performed entirely by machine (computer). This patent, assigned to Kaman Aerospace Corporation (Colorado Springs, Colo.) concerns a novel data processing technique for detecting and locating a target from a plurality of two-dimensional images generated by an imaging sensor such as an imaging lidar system. This series of two dimensional images (made with one or more imaging detectors) is processed in an optimal statistical fashion to reliably detect and locate targets. The process by which the images are mathematically modified reduces the deleterious effects of noise and thereby provides the highest possible probability of detection while simultaneously maintaining a very low probability of false alarm. An data processing technique described also provides an estimate of the reliability of the detection, the target location and an output image to be displayed for visual confirmation and perhaps classification by the operator. The method includes some or all of the following steps: noise reduction, spatial filtering, noise parameter extraction, asymmetric threshold detection, contrast stretching, localization, recognition, range or depth determination and subimage mosaic generation. The method is reportedly particularly well suited for processing two dimensional images of underwater targets generated by an imaging sensor located on an airborne platform whereby the underwater target is precisely and accurately detected, located and identified.

Similarly, U.S. Pat. No. 5,325,466 to Kornacker for a SYSTEM FOR EXTRACTING KNOWLEDGE OF TYPICALITY AND EXCEPTIONALITY FROM A DATABASE OF CASE RECORDS concerns sophisticated location of data. This patent, assigned to Perceptive Decision Systems, Inc. (Columbus, Ohio), concerns a knowledge tree building system. The system iteratively partitions a database of case records into a tree of conceptually meaningful clusters. Each cluster is automatically assigned a unique conceptual meaning in accordance with its unique pattern of typicality and exceptionality within the knowledge tree; no prior domain-dependent knowledge is required. The system fully utilizes all available quantitative and qualitative case record data. Knowledge trees built by the system are particularly well suited for artificial intelligence applications such as pattern classification and nonmonotonic reasoning.

Finally, U.S. Pat. No. 5,416,892 to Loken-Kim and Kyung-ho for BEST FIRST SEARCH CONSIDERING DIFFERENCE BETWEEN SCORES again concerns sophisticated searching. This patent, assigned to Fujitsu Limited (Kawasaki, Japan), concerns a best first search for problem-solving in an artificial intelligence system employing a novel search priority index. The search priority index is calculated based on a difference between scores of a node and the next node in breadth. Searching steps required to attain a solution can be reduced by employing the search priority index.

All these patents generally show that searching in large and/or complex databases needs often be sophisticated. This much is acknowledged by the present invention. However, the present invention will show that the effective sophistication of the search need not inevitably translate into any of (i) difficulty in the search, (ii) opacity of the criterion (criteria) of search, and/or (iii) uncertainty as to the quality of search results.

SUMMARY OF THE INVENTION

The present invention contemplates (i) certain new constructs for similarity-based image databases, and (ii) a new type of man machine (man-computer) interface for navigation in a database of images. The interface facilitates navigation in a display space whose geometric characteristics depend on the geometry of the perceptual space in which image similarity is measured. The display space is a subset of the three dimensional Euclidean space that, for many of the distance functions used, is contained in the unit cube. The perceptual intuition of the metric is given in part by the distribution of images in the space and in part by making the motion of the user uniform with respect to the metric of the space.

The contemplated display space, and the visual navigation transpiring therein, are visually striking, if functionally intuitive of manipulation. However, at a somewhat more mundane level, the present invention also contemplates user-interactive development of the best and most appropriate criteria to extract records from databases, In other words, it is not only the case that the data records may be displayed, and navigated amongst, but that, being so displayed and so navigable, the very criteria of both (i) display and (ii) navigation may be well and better, interactively, derived.

In particular, the present invention contemplates that such criteria should be (i) recursively, or iteratively, derived using (ii) three database search criterion at one time. Still more particularly, the present invention contemplates a specific man-machine interface method of recursively interacting with a database containing object records having a number of attributes to the end of (i) interactively developing three criterion, out of many possible criteria, by which (ii) certain object records having attributes closest (in some finally-developed three criteria) to a reference object record may be identified.

Still further, the present invention contemplates a man-machine interface wherein rational and powerful criteria to extract records from perceptual databases may be developed while a positive indication when selected search criteria and any search results derived therefrom are incomplete, poorly directed and/or even worthless garbage is provided—including as may all be performed by semi-skilled labor. In effect, the man-machine interface of the present invention not only (i) delivers the results of database searching in the form of new and very useful, information-rich, displays, while also (ii) supporting development of the very best database search criteria (in solution of any database search requirement(s), howsoever initially ineptly formulated, and howsoever the search results are ultimately to be displayed), but still further (iii) candidly reveals the quality of its performance—all as may be obtained by semi-skilled labor!

It is respectfully suggested that it should be quite interesting to see how, in accordance with the present invention, a man machine interface system is going to accomplish all these useful goals. Here is a hint: it will be strongly compatible with, and will rely upon, the visual image processing capability of the human brain. We (who are sighted) can all see (i) where things are, and how things are distributed in space, (ii) how things compare (or are dissimilar), and (iii) how things change. These very powerful capabilities of the human brain will be strongly coupled in the database search and search result display system of the present invention.

1. Theory of the Invention

The present invention is embodied in a similarity-based database of images, preferably where the images are ranked and correlated in correspondence to biological preattentive similarity. The present invention is further embodied in new type of man-machine (man-computer) interface for visual navigation within the database to the end that a human user may perceive not only selected images resultant from a query, but the relationship between the selected images.

In particular, this process by which both (i) images and (ii) image relationships may be perceived is called "navigation". The user "navigates" among the images from the database. He/she is able to do so because the images are displayed within a display space having a Riemann, meaning multi-dimensional, metric that is much richer and more general than is the metric of previous display spaces which previous metric is generally based on simple Euclidean distance.

In fact, the geometric characteristics, or metric, of the display space depend on the geometry of the perceptual space in which image similarity is measured. The display space is a subset of the three dimensional Euclidean space that, for many of the distance functions appropriate to the images displayed, is contained in the unit cube. The perceptual intuition provided the human user is (i) in part due to the distribution of images in the display space, and (ii) in part by making the motion of the user uniform with respect to the (Riemann) metric of the space.

Before going over these concepts again—and they are numerous—it is useful to understand a specific example. A data base of images, or an "image database" may contain, by way of example, a great number of images which include, by way of example, a picture of the British flag; the Union Jack. The images can be ordered, or ranked, within the image database—if at all—in an absurdly large number of ways. In accordance with the present invention, the images are preferably (but not invariably) ordered within the image database by specific criteria—nominally 1) color, 2) color distribution, 3) structure, and 4) fine structure, all as are preferably measured by use of the six operators of 1) AND, 2) OR, 3) NOT, plus 4)–6) three more. The criteria and the criteria correlations for ordering (or ranking) the numerous images need not be these precise criteria: the main idea being simply that the images should be ranked based on what is best referred to as "preattentive similarity".

There are lots of ways of ranking images; why is ranking by "preattentive similarity" of any particular value? The answer is that the images will ultimately be presented (many at a time, in parallel) to a biological organism that responds well to ordering, and to differentiation, based on preattentive similarity: a human user. It might thus be said that the images are "pre-ordered" within the image database in accordance with what the mind of the user can best accept!

The ordering of the images within the image database is but the beginning of the present invention. The ordered images are endowed with a metric structure; creating a Riemann manifold that is called (in this instance) a "perceptual space". The particular (Riemann) metric structure, and the way that the images are laid out in the perceptual space, contains and preserves a great deal of very valuable information about the relation between images, and the relevance of an image for the query that is being asked.

In particular, a number of images are normally presented in response to a single query such as, by way of example, "show me images closes to the image of the Union Jack". These images are presented in three dimensions, appearing much like pictures hung in the three-dimensional space of some virtual gallery, or virtual museum. The three axis of this perceptual space might be, for example, the three primary colors. Images appearing close to the Union Jack image would, of course, have very nearly equal colors distributions to the Union Jack. Still other dimensions could be displayed: consider that the eye is sensitive to hue, lightness and saturation (hue, brightness and saturation for light sources) These qualities can be fully preserved, even accentuated, in the images presented. The perceptual space is thus multi-dimensional (even to dimensions greater than three), and very rich to the senses (particularly to the sense of vision, being that the displayed images are not normally heard and even less commonly touched or smelled or tasted).

It is because the display space is a rich feast for the senses that it is called a "perceptual space". Compare this "perceptual space" presentation of the present invention to traditional database interfaces (usually composed of only a browser in which the user can look at the list of images returned by the database) where all, or almost all, metric information is lost. The traditional browser gives the user information—a list or a display—about the ordinal properties of the result (which one of two images is closer to the query), but it gives no information about the geometric properties of the space (which image is close to which).

The display of images in this 3-D perceptual space is still not the end of the present invention. In order to give the user maximum ability to assimilate and use the comprehensive and valuable information presented in the perceptual space, the user is permitted to move, or navigate, among the displayed results shown in the perceptual space. This navigation in the perceptual space is made possible by the geometric structure of the perceptual space, meaning that the space is set up so as to curve in upon itself, with its geometry dynamically determined by the particular queries that have then been input. As is suggested by the common experience of navigating an avatar in the three-dimensional space of an interactive computer game, the user will never reach a "border" of the space. Instead, the images will generally be more concentrated in areas where the metric tensor is small—i.e., where are located images similar to the query—while the images farther away from the query will in general be concentrated at the borders of the space. However, and remembering that the image correlations meed not, and generally do not, match the relatively homogeneous feature distribution occurring in a virtual reality computer game, it is an entirely unanswered question as to just how, in detail, navigation within the perceptual space should proceed.

Navigation in accordance with the present invention preferably gives the user a feeling of the geometry of the space is by adapting the velocity of the user's motion within the space to the local geometry of the space so as to create a kinetic, in addition to a visual, experience of the space. Navigation so conducted is at the same time both simplistic and profound. Simplistically it means that the user will never reach any "edge" of the space, as discussed above for computer games. However, and quite unlike computer games, the user will navigate through the space in accordance with the content thereof. It is more like changing one's focus of vision in one's environment (a saccade, which humans do readily) than it is like a continuous scan across one's field of view, even at a variable rate of scan (which humans rarely do). When it is remembered that the images are presented in a manner consonant with preattentive similarity, the ability of the user to "navigate" though an environment of such images much as one might "navigate" in the real world is quite marvelous, and gives the user a very good "feeling" of the geometry of the space, and of the relationship of the images within the space.

2. Primary Systems and Methods of the Invention 2.1 An Image Data Presentation System Accordingly, in one of its aspects, the present invention is embodied in an image data presentation system.

The preferred system includes (i) a data store for holding a number, typically a great number, of images, (ii) an input device for permitting an operator to query the multiplicity of images, (iii) a computer, and (iv) a display.

The (iii) computer ranks the images that are within the data store in response to a query received from the input device on the basis of preattentive similarity, meaning that the images are endowed with a metric structure, arising from the query, so as to create a Riemann manifold. The images are laid out within this Riemann manifold so as to preserve information about their relationships.

The (iv) display presents the ranked images within the Riemann manifold as (i) a perceptual space having a geometry in accordance with the metric structure of the manifold, with (ii) the ranked images being located within the perceptual space in accordance with their relationships.

By this coaction, the relationship of the images is, at least insofar as the metric of the geometry of the perceptual space, made visible. The images are both (i) located in the perceptual space in accordance with their properties, and (ii) located relative to one another in accordance with the similarities or distinctions of these properties.

Still further in accordance with the image data presentation system, the input device also permits a human operator to navigate among the images displayed within the perceptual space. It does so because the computer dynamically re-ranks the images in accordance with navigational inputs received from the operator via the input device, and because the display presents the re-ranked images dynamically. A kinetic experience is thus added to the visual presentation of the geometric organization of the images.

2.2 An Image Database System

The present invention may alternatively be considered to be embodied in an image database system.

Namely, a preferred image database system in accordance with the present invention is responsive to a user query for displaying selected images best satisfying the query out of a great multiplicity of stored images. Such an image database system is characterized in that conventional matching between stored images in response to the user query is replaced by more general similarity measures based on (i) simple sensorial impressions that are accorded the user (ii) in a perceptual space (iii) endowed with a Riemann metric that is more general than is the usual Euclidean distance.

"Simple sensorial impressions" simply means that the user can see or otherwise sense the selected images. "In a perceptual space" simply means that the selected images which accord the user the simple sensorial impressions are within a Euclidean space, or volume. "Endowed with a Riemann metric" simply means that the perceptual space is ordered, and thus the selected images displayed therein are sensed by the user to be ordered in accordance with their properties as were relevant to the query.

By this organization, the user does not merely sense the selected images, but further senses the relationship between and among the selected images within the perceptual space, and in accordance with the Riemann metric. Moreover, the geometric aspects of the displayed perceptual space permit the user to understand the relations between the selected images, and not merely the presence or absence of any one of the great multiplicity of images.

Distances in this perceptual space may be, and preferably are, computed dependent upon a particular query that is being asked.

2.3 A Man-Machine Interfacing Method

Still further, the present invention may alternatively be considered to be embodied in a man-machine interfacing method for permitting a machine user to navigate in a database of images. In this case, "to navigate" means to come to learn and to sense and to know not merely the images that are within the database but also relationships between and among the images.

The preferred man-machine interfacing method consists of (i) defining a display space whose metric is derived from metrics defined by the user as input to the machine, (ii) displaying each display space as a subset of the three dimensional Euclidean space that is contained in the unit cube, and (iii) deriving the metric inside this space from the metrics of the user inputs.

3. Interactively Developing the Best and Most Appropriate Criteria to Extract Records from Databases The present invention clearly has aspects of (i) an image data presentation system, (ii) an image database system, and (iii) a man-machine interfacing method. Incredibly, there is still more.

In accordance with the present invention, the best and most appropriate criteria to extract records from databases are identified and developed in an interactive process transpiring between man and machine (i.e., computer). Once the basic procedure is understood, it is possible for searchers both relatively skilled and relatively unskilled to achieve superior results in searching, or data mining, databases, including those containing complex data and those of immense size.

(Because many aspects of the present invention concern visually perceptible data records, it is important to keep in mind in the next ensuing discussion that the search-criteria-selection aspect of the invention is not limited to visual records and may be applied to databases and database records of any type. For example, the method may be applied to databases of pure numbers as might represent, for example, temperature and pressure and radiation flux and density, etc., at points in space.)

The method of the invention is (i) recursively performed using (ii) three database search criterion at one time. More specifically, it is a man-machine interface method of recursively interacting with a data-base containing object records hating a number of attributes to the end of (i) interactively developing three criterion, out of many possible criteria, by which (ii) certain object records having attributes closest (in some finally-developed three criterion) to a reference object record may be identified.

The method commences by manually selecting three criterion that correspond to an associated three or more attributes possessed by object records—located within a machine database—each of which has a object records typically has a great number (many more than three) of attributes.

A machine then searches and orders the object records in accordance with the selected three criterion, and displays the results.

Importantly, the results are preferably so displayed in a three-dimensional plot with each of the three criterion lying along an associated axis and with each object record being plotted in accordance with its attributes. The attributes of a reference object record are at the origin of the plot. So far this is somewhat similar to a conventional, two dimensional, "scatter plot" of data. It is somewhat different in any of the aspects that (i) the criteria are three in number, and selected from among many, (ii) the plot is three, and not two, dimensional, and/or (iii) the attributes of a reference record (or a nominal "base" record) determine the origin of the 3-D display. Of course, it might be noted that the 3-D display is normally presented on a 2-D viewing screen. It is, however, a simple matter to rotate, and to select, the axis of display, and it is intended that the human observer should look at the entire three dimensions of the display in order to determine the distribution of object records plotted (three criterion, of attributes) therein.

In particular, a human observes the distribution of the three-dimensionally plotted and displayed object records in any of their locations, dispersion, or clustering in each ordinate axis of the display. By this observation the human may recognize, for example, that the plotted object records are substantially tightly clustered for one or more criterion (criteria)—making this (these) criterion (criteria) useless to discriminate among the object records—while the same object records show a good dispersion relative to another criteria—making this (these) criterion (criteria) useful to discriminate among the object records. By this recognition the human is able to formulate one or more new criterion (criteria) that might potentially be more advantageous for associating and identifying those object records that most closely corresponding to the reference object record than is (are) the present, old, criterion (criteria).

Each of the steps of (i) manually selecting with the new criterion substituted for the old criterion, (ii) machine searching and ordering, (iii) machine displaying, and (iv) manually observing to formulate new criterion are recursively repeated until, finally, the object records are three-dimensionally plotted and displayed in accordance with a finally-developed three criterion.

At his time, and in this final display, those individual object records that are closest (in terms of the finally-developed three criterion) to the reference object record (which reference object record is always plotted at the origin of the display plot) may be readily identified.

More importantly to this method of the present invention than mere identification of "close" and "distant" objects by some criterion or criteria (which process is old in the art) has been, of course, the dynamic interactive selection of the best appropriate criteria in the first place! The most telling criterion (criteria), and the associated object record attributes to identity those individual object records that are closest to the reference object record, may not have been known, and likely were not known, at the start of the process. However, as the steps of the process are correctly recursively performed then it is possible to draw out of the database of object records those object records that are truly close, in some meaningful criteria, to the reference object record.

The dynamic interactive selection of the best and most appropriate criteria for identification of object records that are "close" by some meaningful criteria to a reference object record has been a recursive process, as is supported by both (i) the processes of the machine (software running in a computer) and (ii) the observations of the man. It will of course be understood that the method can be repeated for different reference object records, and/or for different databases. After (i) identification of "optimal" criteria, and (ii) observation of the distribution of search results respective of these (3) "optimal" criteria, among (1) many searches relative to the same or like object records in many databases, and/or (ii) differing object records in a same database, it becomes possible to realize that a search, any search, has been "good" or "bad", meaning well or poorly effective in isolating few or many, close or more distant, object records.

Still furthermore, the characteristics of the database itself may become revealed by many searches. Namely, a database, like an oracle, may become known by the knowledge that it reveals. Suppose for example that a database (herein visual imagery is employed for the sake of illustration) returns "dynamite" results to repeated searches for faces, but performs poorly on searches for landscapes. Another database may function oppositely. Does this mean only that one database is rich in portraiture, the other in landscapes? It does not. It means that the portraiture in the one database is well distributed to be selected among, and the landscapes in the other database. That it is irrelevant how many images (including of the appropriate type) are contained in a database producing "dynamite" search results (for imagery), consider the results of searching for mountains in a large database containing many millions of seascapes versus in a small portraiture database showing people posed in all landscapes, including in mountainous landscapes. The better and more meaningful comparisons to images of "mountains" might well be obtained from searching in the small portraiture database.

4. Development of Rational and Powerful Criteria to Extract Records from Perceptual Databases, With Positive Indication When Selected Search Criteria and any Search Results Derived Therefrom Are Incomplete, Poorly Directed and/or Worthless Garbage—Including as May All be Performed by Semi-skilled Labor In another of its aspects, the present invention permits the quality of a search to readily be determined, at least when the search is among database records having at least some (but not necessarily all) attributes that are readily visually perceptible when these records are displayed (i.e., those databases that are called in this specification "perceptual databases").

Again in accordance with the present invention, and as was the case with the aspect of the invention discussed in the previous section 3, the best and most appropriate criteria to extract records from (perceptual) databases may be developed in an interactive, preferably recursive, process transpiring between man and machine (i.e., a computer). One the basic procedure is understood, it is possible for sighted searchers both relatively skilled and relatively unskilled to achieve superior results in searching, or data mining, even complex (perceptual) databases of potentially immense size.

For example, in an extreme demonstration of the method, it might be possible to charge a newly hired high school graduate to locate within a database of millions of chest x-ray images those images most closely replicating a reference image showing a distended aorta. Although the novice can be led to understand that image-processing computer software permits ordering and selection of images in accordance with numerous criteria such as opacity, black-white balance, texture, etc., etc., he or she will generally "not have clue" as to how to use these tools to obtain results. For that matter, even the experienced searcher needs to know whether his or her selected criteria are optimum for a particular search problem. The search criteria selection (and search) method of the present invention is usable by anyone having eyes to get superior results.

Likely more importantly than the ("superior") search results obtained, is knowing qualitatively just how good and reliable these results are. In this the present invention excels. It is possible, by simple visual observation, to interpret whether the search results are more or less incomplete, and whether the search has been well or poorly directed. Contrary to the often-existing present situation where worthless garbage is presented as the results of search and analysis simply because this "garbage" data has been highly accurately processed by computer, searches in accordance with the present invention will clearly reveal when, if ever, they are delivering information that is essentially worthless (i.e., "garbage").

In simplistic terms, database searches in accordance with the present invention are easy (at least to the sighted) while being revealing of the quality of results obtained (again to the sighted).

The method of present invention functions to realize these advantages by displaying ordered in geometric space a selected number (typically several hundreds or thousands at one time) of object records—each of which selected object records is visually perceptible when so displayed, meaning that at least to some trained human eye a distinction of the object record when displayed from other object records likewise concurrently displayed is readily visually sensible—drawn from a database of a great number (potentially hundreds of thousands, and millions) of visually perceptible object records.

In so doing, the method of the present invention employs two or more, typically three, selected criterion at one time. The selected criterion, which are typically manually so selected, correspond to associated attributes that are possessed by each of large number of object records—each of which has numerous attributes—that are located within a database. For example, the criterion, and associated attributes, may be (i) color, (ii) composition, (iii) texture, (iv) structure, and—as an non-visual criterion/attribute—(v) title.

The great number of object records of the machine database are searched and ordered in accordance with the (typically three) criterion. The results of the searching and ordering are displayed in a plot with each of the selected plurality of criterion lying along an associated one axis. When, typically, three (3) criterion are considered at one time, this plot is of a three-dimensional (3-D) ordinate space. Each object record is plotted in position along all (three) axis in accordance with its attributes. An arbitrary object record—which may be considered the "search standard"—is located at the origin (3-D coordinates [0, 0, 0]) of the plot.

Importantly, concurrently with the displaying of the plot least some of the plotted object records are further displayed. These plotted object records are displayed in a manner in which they are both (i) visually perceptible, and (ii) positionally associated with the plot. It will be recalled that the "visually perceptible" records displayed are readily visually sensible, meaning that the similarities or differences between these records—images if is convenient for the reader to so think of them (being that we are all familiar with perceiving images)—are, if not discernible "at a glance", at least clear. Meanwhile, the "positional association" preferably typically transpires by locating a representative "smattering" of records (images) along an ordinate axis below the plotted records (images), or, most preferably, by displaying the records (images) right where they are plotted (most preferably in 3-D space).

Clearly the records, or at least some of the records, are being seen in spatial relationship to each other in accordance that they are spatially ordered by the criterion. (Note that the attributes of the object records that are visually perceptible need not necessarily being those that correspond to the criterion by which the plot, or at least some axis of the plot, were generated. For example, one axis of the plot may be alphabetized record titles.)

Many immensely valuable things (even beyond the records' plot dispersion discussed in the previous section 3) may be readily perceived. Suppose that, along a one axis, perceptible records (images) that were much alike were scattered in location both closely to, and remotely from, the origin. Clearly the attribute being measured along that axis is irrelevant to selecting records (images) homogenous to the reference record (image) occupying the origin. Suppose, conversely and considering all three (preferred) dimensions, all the records (images) that are in vector distance close to the reference record (image) occupying the origin are very much like this reference record (image), and all those records (images) that are in vector distance very remote from the reference record (image) are very unlike this reference record (image). This later case would likely mean that the (preferably three) criterion of search had been very effective, and of "high quality", in isolating and separating the records of interest.

In general, the displayed (i) plot, in combination with (ii) visually perceptible attributes of at least some of the plotted object records positionally associated with these at least some object records, permits a human to readily form an impression that those plotted object records that are located relatively more closely to, and relatively more distant from, the arbitrary object record along any one or more of the axis either are, or are not, coherently related one to another in their perceptible attributes displayed.

If the human is given the impression that the at least some object records displayed are, along some axis or axis and at some location or locations of the plot, coherently related, then this means that object records within associated regions of the plot, whether ranked in accordance with the visually perceptible attributes or no, are likewise coherently related. This means simply, but profoundly, that the object records have not only been ordered, but that they have likely been successfully (i) rationally ordered by (ii) some rational criteria of ordering. In other words, the quality of the search results is manifest in the display of the search results themselves!

Conversely, if the human is given the impression from the at least some object records displayed that there is no location of the plot wherein the visually perceptible attributes of the at least some object records are coherently related, then this does not conclusively mean that there are no such regions, nor any such attributes, but it does indicate that, at least for the perceptible attributes and the at least some object records displayed, the human the object records have unlikely been (i) rationally ordered by (ii) any rational criteria of ordering. In other words, if not garbage, the search results should certainly be "taken with a grain of salt" that they are incomplete, poorly directed, and/or even misdirected.

Clearly the method and the displays of the present invention are strong tests for the rationality, and the quality, of the criterion (criteria) of searching and ordering records. It is hard to search, or data mine, data "garbage" without knowing it. Likewise, it is hard to locate only a small "vein" of related data and mistakenly declare it to be "the mother lode".

The things that the human observer can "tell at a glance" are truly extensive, and useful. The human observer can tell (i) whether those records shown to be close to the arbitrary object record truly are similar. He/she can tell (ii) to what apparent degree these records are relatively more similar to the arbitrary object record then those shown more distant. Similarly, he/she can tell (iii) whether the records shown to be distant from the arbitrary object record truly are dissimilar, and (iv) to what apparent degree these distant records are relatively more distant from the arbitrary object record then those shown to be more closely located. Sometimes surprises arise: records that are seemingly close are distantly situated; records that are seemingly remote are closely situated. Worse, sometimes the records remotely situated are all of a class, or a type, that is worthy of inclusion, and that would likely have been completely missed if the visual indications of the present invention were not available.

The amount to which there is "intermixing", or confusion, in the results is, of course, a visual indication of the "quality" of the search. It is even possible to statistically quantify this "quality". It might be said, for example, that of a random one hundred of the records within the "included" perimeter of search (wheresoever that should be set), only, for example, 4% were deemed irrelevant, while of a random one hundred records located within the ordered database just beyond one standard deviation from the arbitrary object record, less than 4% were found that should/would/could have arguably been included, and worthy of interest, under alternative criteria of search and identification. The displays of the present invention, when applied to common databases of diverse scientific and commercial purposes, often go a long way towards disabusing a searcher of the opinion that the results of his or here search are sacrosanct, absolute and inviolable, and instead serve to quickly educate the searcher that unless all absolute criteria of search are absolutely known—which is rare for real-world data and real-world searches—then the search results are always somewhat contaminated (over inclusive) and incomplete (under inclusive).

5. Further Methods of the Invention

5.1 A Man-Machine Interface Method

Accordingly, the present invention may still further be considered to be embodied in a man-machine interface method in which both man and machine recursively interact with a database containing object records having a multiplicity of attributes to the end of (i) interactively developing particular criterion or criteria, out of multiplicity of criteria, by which (ii) a plurality of object records that have attributes that are, by the particular finally-developed criterion or criteria, closest to a reference object record may best be identified.

The preferred method commences with manually selecting three criterion corresponding to an associated three or more attributes possessed by object records having a number of such attributes that are located within a machine database.

The object records of the machine database are then searched and ordered by the machine in accordance with each of the selected three criterion.

The machine next displays the results of the searching and ordering in a three-dimensional plot with each of the three criterion serving as a metric of an associated one axis and with each object record plotted, each in accordance with its attributes, relative to each axis. The attributes of a reference object record are preferably at the origin of the plot.

The human user manually observes the distribution of the three-dimensionally plotted and displayed object records in any of their locations, dispersion, or clustering in each ordinate axis of the display. By this observation the human user may both recognize and formulate one or more new criterion that might potentially be more advantageous for associating and for identifying selected object records closely corresponding to the reference object record than are a corresponding one or more of the old criterion by which the displayed object records are presently ranked and ordered.

Each of the steps of manually selecting with the new criterion substituted for the old criterion, machine searching and ordering, machine displaying, and manually observing to formulate new criterion are then recursively repeated until, finally, the object records are three-dimensionally finally plotted and finally displayed in accordance with a finally-developed three criteria.

From this final display those individual object records that are closest by the finally-developed three criteria to the reference object record may be identified. When, as is usual, the reference object record is plotted at the origin, then these three criteria are simply the ones of the three axis.

In this process, the most telling three criterion and associated object record attributes to identity those individual object records closest to the reference object record may not have been known at the start of the process, but as the steps of the process are correctly recursively performed it becomes possible to draw out of the database of object records those object records that are truly close, at least in three criterion that are presumptively meaningful, to the reference object record.

5.2 A Method of Displaying Object Records

Accordingly, the present invention may yet still further be considered to be embodied in a method of displaying a multiplicity of object records, each of which object records is visually perceptible, from a database of a great number of visually perceptible object records. "Visual perceptible" means that, to at least to some trained human eye, a distinction of the object record when displayed from other object records likewise displayed is readily visually sensible.

In accordance with the invention, the preferred display method starts with selection of several, typically three, criterion corresponding to an associated number of attributes possessed by each of a great number of object records, each of which has a multiplicity of attributes, that are located within a database.

The great number of object records of the machine database are searched and ordered in accordance with the selected plurality of criterion.

The results of the searching and ordering are displayed in a plot with each of the selected plurality of criterion lying along an associated one axis, with each object record being plotted along all axis in accordance with its attributes, and with an arbitrary object record being at the origin of the plot.

Concurrently with the displaying of the plot, at least some of the plotted object records are displayed in a manner in which these object records are both (i) visually perceptible, and (ii) positionally associated with the plot. (The attributes of the object records that are so visually perceptible need not necessarily be those that correspond to any of the plurality of the criterion of the plot.)

The displayed (i) plot, in combination with (ii) visually perceptible attributes of at least some of the plotted object records positionally associated with these at least some object records, permits a human to form an impression that those plotted object records that are located relatively more closely to, and relatively more distant from, the arbitrary object record along any one or more of the axis either are, or are not, coherently related one to another in their perceptible attributes displayed. If the human is given the impression that the at least some object records displayed are, along some axis or axis and at some location or locations of the plot, coherently related, then this means that object records within associated regions of the plot, whether ranked in accordance with the visually perceptible attributes or no, are likewise coherently related. This of course means that the object records have likely been successfully (i) rationally ordered by (ii) some rational criteria of ordering.

However, if the human is given the impression from the at least some object records displayed that there is no location of the plot wherein the visually perceptible attributes of the at least some object records are coherently related, then this does not conclusively mean that there are no such regions, nor any such attributes, but it does indicate that, at least for the perceptible attributes and the at least some object records displayed, the human the object records have unlikely been (i) rationally ordered by (ii) any rational criteria of ordering.

Accordingly, the method is as much a test for the rationality of some criteria of ordering as it is a basis for ordering object records in accordance with some criteria.

These and other aspects and attributes of the present invention will become increasingly clear upon reference to the following drawings and accompanying specification.

DESCRIPTION OF THE PREFERRED EMBODIMENT

1. Measuring Similarity

Figure 1:
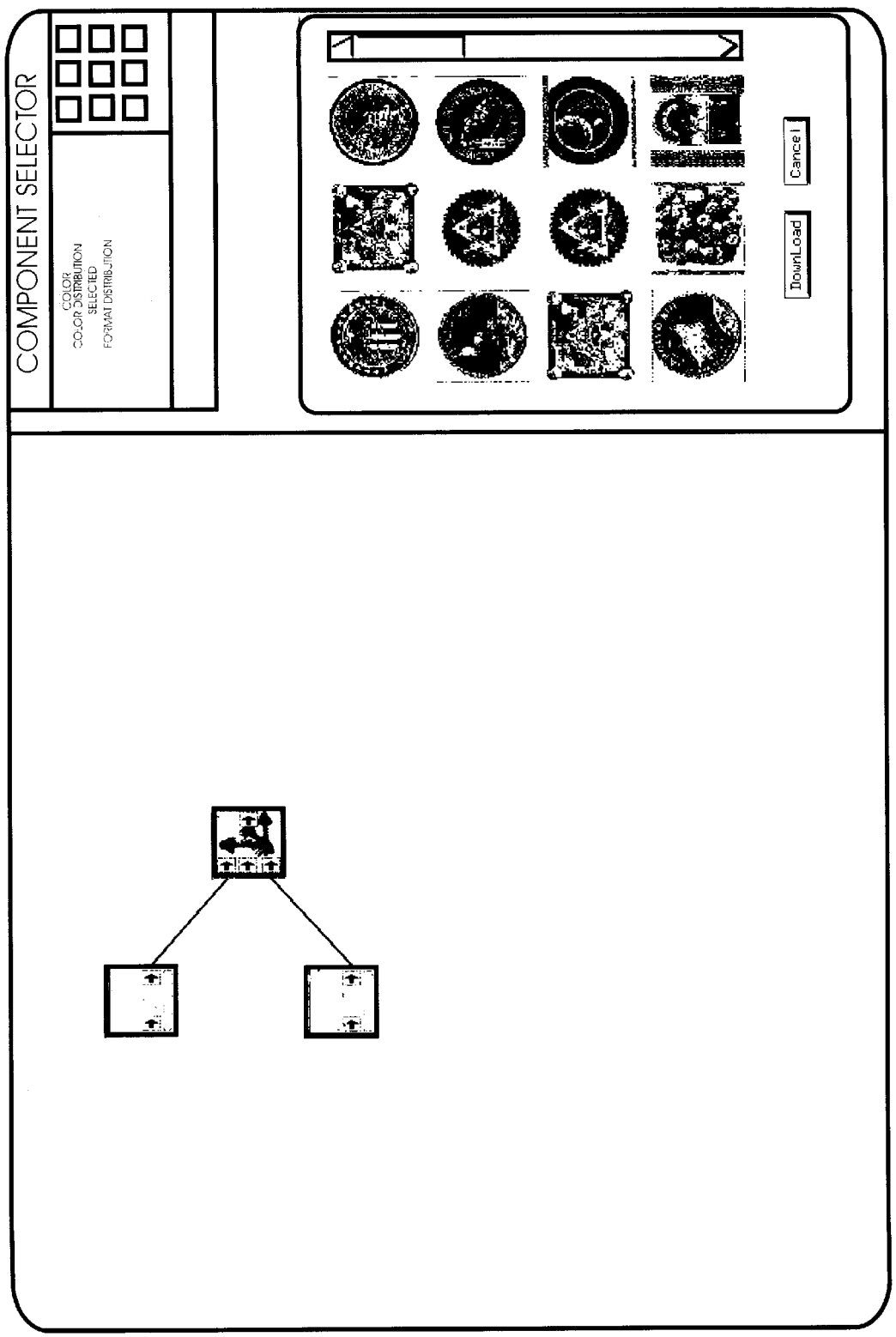
FIG. 1 is a view of a screen showing the user interface for composition of a query in the visual navigation system (for perceptual databases) of the present invention.

The first thing to be considered in organizing a similarity database is how to measure similarity. A similarity measure to which the user sitting in front of the computer can relate is desired, but there are limits to what can and should be done. Reference Santini 96a. A first limit comes from the assumption (that, admittedly, can be relaxed in real world applications) that the database contains no labels or annotations, and there is no information except from that provided by the images. A clue on what type of construct to use in a perceptual database is provided by looking at animals. Reference Bruce 85 and Yeo 79.

The inventors argue (very briefly in the BACKGROUND OF THE INVENTION section and more extensively in references Santini 96c, Santini 97a) that the only perceptual similarity that can meaningfully be used in a perceptual database is preattentive similarity. In preattentive similarity judgment of similarity is performed without focusing attention on any part of the image. In biological organisms this is probably done in relatively low-level processing areas of the brain in time lapses too short to allow multiple foveations to take place. Reference Hubel 67. The higher processes responsible for recognition also cannot operate and therefore preattentive similarity is based on different features than attentive perception. Reference Olson 70 and Treisman 87.

The theory of the present invention is built on the assumption that the relevant features for preattentive similarity perception can be derived from a multi-resolution analysis of the image. Reference Santini 97a. Multi-resolution analysis is probably connected to what early areas in the human visual system, like the lateral geniculate nuclei and the striate cortex do. Reference Mason 91, Shapley 90, Van Essen 84, and Wilson 90. It is a type of processing that depends only on the image data, and without any reference to models of the world or to stored knowledge.

2.1 Psychological Models of Similarity

Similarity has been subject of many psychological studies for many years. There are a number of "black box" theories of similarity perception, which make different assumptions about the similarity mechanism, and explain different aspects of experimental findings. The authors give a quite detailed review of these models in reference Santini 96a, to which the reader is referred. In this section the major points of debate and the most successful theories are briefly covered in order to give the reader the background necessary to follow the rest of the specification disclosure.

One natural assumption, and the easiest we can make, is that similarity depends on a distance in some suitable perceptual space. Reference Ashby 88, Householder 45 and Tversky 70. Stimuli are translated into features in this space, which has a metric structure that depends on the nature of the stimulus (visual, aural, etc.) and a function is applied to this distance to yield the similarity. Reference Shepard 87. That is, similarity is something like $$s(S_a, S_b) = g[d(S_a, S_b)] \tag{1}$$

where d is a distance and, as such, satisfies the distance axioms:

$$d(S_a, S_a) \leq d(S_a, S_b) \tag{2}$$

$$d(S_a, S_b) = d(S_b, S_a) \tag{3}$$

$$d(S_a, S_b) \leq d(S_a, S_c) + d(S_c, S_b) \tag{4}$$

Using this model, Shepard (see reference Shepard 87) showed that the function g is universal. In other words, all the experimental data from different types of stimuli (not necessarily visuals) could be explained assuming that g has an exponential behavior and d is a suitable metric.

The fact that the function d is a distance, and satisfies the metric axioms, allows the theory to make some predictions about the outcome of the similarity experiment. For instance, the metric theory predicts that the similarity is symmetric and that self-similarity (the similarity of a stimulus with itself) is constant across the stimuli, and minimal. There is quite convincing empirical evidence that this is not the case: experimental data reveal that human similarity assessment is not symmetric and that self similarity is neither constant nor (under special circumstances) minimal. This finding inspired a number of "æmendaments" to the raw distance model. Reference Krumhansl 78 and Ashby 88.

A completely different approach was taken by Amos Tversky in his famous Feature Contrast Model. Reference Tversky 77. Tversky assumes that a stimulus $S_a$ is described by a set of binary features, A. The features are binary in the sense that a given feature either is or is not in A, but it doesn't assume any specific value. These features can also be seen as the set of predicates that are true on $S_a$. For instance, a typical Tversky feature would be "to have rounded corners," and it can be seen as the truth of the predicate "the figure has rounded corners." If two stimuli $S_a$ and $S_b$ are characterized by the feature sets A and B, then Tversky proved that a wide class of similarity measures can be reduced to the form $$S(S_a, S_b) = \theta f(A \cap B) - \alpha f(A-B) - \beta f(B-A) \tag{5}$$

that is, the similarity is the difference (contrast) between a function of the features the two stimuli have in common and of the features that distinguish them. The function f is called the "saliency function" and is usually a monotonically increasing function of the size of its argument:

$$f(A) = f(|A|) \tag{6}$$

This model has been very successful in explaining the different aspects of human similarity, and is the basis around which the similarity theory of the present invention is built.

2.2 Extending the Feature Contrast Model

From the point of view of the inventors, the Tversky model has one fatal drawback: it requires binary features. This is fatal both to the endeavor of the present invention to use preattentive similarity, and to the practical feasibility of the system that will result. Binary features encode the truth value of logic predicates about the stimulus. It is quite unlikely that at the level of preattentive similarity humans and animals have available the neural structures necessary to express such predicates. During the early stages of vision, the visual system does measurements on the image, and it is likely that preattentive similarity is based directly on these measurements. From a more practical point of view, in artificial systems the inventors start with measurements on the image. Predicates like those necessary to express Tversky binary features are very hard to extract: they are computationally expensive, unstable, and context sensitive.

In Reference Santini 96a the inventors extended Tversky's theory to deal more directly with measurements on the image rather than on predicates. This was accomplished by borrowing some ideas from fuzzy logic. A predicate like "this area is green" is based on measuring the hue of a given area in the scene. In the present invention this can be modeled as a fuzzy predicate whose truth is based on the measurement of the hue of that particular area.

More in general, suppose n measurements exist on the image $$s = \{s^1, \ldots, s^n\}. \tag{7}$$

These measurements can be used to compute the truth value of m fuzzy predicates and collect them into a vector:

$$\mu(s) = \{\mu^1(s), \ldots, \mu^m(s)\}. \tag{8}$$

The inventors call $\mu(s)$ the (fuzzy) set of the true predicates. In order to apply the Tversky model, the saliency function is chosen to be the cardinality of the fuzzy set:

$$f(\mu) = \sum_{\lambda=1}^{m} \mu^\lambda \tag{9}$$

The intersection of two fuzzy sets, based on the measurements $s_1$, $s_2$, is defined as:

$$\mu_\cap(s_1, s_2) = \{\min\{\mu^1(s_1), \mu^1(s_2)\}, \ldots, \min\{\mu^m(s_1), \mu^m(s_2)\}\} \tag{10}$$

The difference of two fuzzy sets is defined as:

$$\mu_-(S_1, S_2) = \{\max\{\mu^1(s_1) - \mu^1(s_2), 0\}, \ldots, \max\{\mu^m(s_1) - \mu^m(s_2), 0\}\} \tag{11}$$

with these definitions, the Tversky similarity becomes:

$$S(s_1, s_2) = \theta \sum_{\lambda=1}^{m} \min\{\mu^\lambda(s_1), \mu^\lambda(s_2)\} - \tag{12}$$

$$\alpha \sum_{\lambda=1}^{m} \max\{\mu^\lambda(s_1) - \mu^\lambda(s_2), 0\} -$$

$$\beta \sum_{\lambda=1}^{m} \max\{\mu^\lambda(s_2) - \mu^\lambda(s_1), 0\}$$

More often, the dissimilarity between two stimuli is most interesting, which can be expressed simply as minus the similarity:

$$D(s_1, s_2) = \alpha \sum_{\lambda=1}^{m} \max\{\mu^\lambda(s_1) - \mu^\lambda(s_2), 0\} + \tag{13}$$

$$\beta \sum_{\lambda=1}^{m} \max\{\mu^\lambda(s_2) - \mu^\lambda(s_1), 0\} -$$

$$\theta \sum_{\lambda=1}^{m} \max\{\mu^\lambda(s_1) - \mu^\lambda(s_2)\}$$

3. Geometric Feature Contrast

The majority of similarity models proposed by psychologists assume that similarity is a function of a distance in some suitable metric space. These models are appealing for preattentive similarity because are directly based on measurements on the stimuli rather than on predicates like the Tversky model. On the other hand, metric models have problems in explaining some characteristics of human similarity perception which are explained well by Tversky's model.

In this section it is shown that it is not necessary to give up the power of set-theoretic models if the advantages of geometric models are desired. All we has to be done is to give up the requirement that the perceptual space should be a simple one in which the metric is Minkowski. In order to retain the advantages of set-theoretic models, the invention will have to use geometries in more general Riemann spaces. Reference Okubo 87, Lovelock 89, Boothby 75 and Warner 83. The inventors do this by deriving the geometry of a Riemann space in which equation (13) is the distance function.

Let two stimuli be given characterized by measurements s, r, $\in F \subset IR^n$, where $s_i$ is the i-th measurement of the set s. The similarity between the two stimuli is based on the truth value of m predicates, which are contained in a suitable predicate space. The truth value of the λ-th predicate based on the measurement is:

$$\eta^\lambda = \mu^\lambda(s) = \mu(A_1^\lambda s^i) \tag{14}$$

REMARK: In this section, all Latin symbols refer to quantities defined in the perceptual space, and all Latin indices span 1, ..., n. All Greek symbols refer to quantities defined in the predicate space, and Greek indices span 1, ..., m. Moreover, we will use Einstein's summation convention: when an index is repeated twice in a monomial expression, a summation over the range of that index is implied, so:

$$x_i y^i = \sum_{i=1}^n x_i y^i$$

Meanwhile, and continuing, the truth value of the predicates based on the measurements r is:

$$\pi^\lambda = \mu^\lambda(r) = \mu(A_1^\lambda r^i) \tag{16}$$

Given the truth values $\mu^\lambda(s)$ and $\mu^\lambda(r)$, the truth value of the predicate: "predicate λ is true for both s and r" is a suitable function of the truth values of the two predicates:

$$\bigcap^\lambda (s, r) = \bigcap (\mu^\lambda(s), \mu^\lambda(r)) \tag{17}$$

$$= \mu^\lambda(s)\sigma(\omega(\mu^\lambda(r) - \mu^\lambda(s))) + \mu^\lambda(r)\sigma(\omega(\mu^\lambda(s) - \mu^\lambda(r)))$$

While the truth value of the predicate "predicate λ is true for s but not for r" is:

$$\Theta^\lambda(s, r) = \Theta(\mu^\lambda(s), \mu^\lambda(r)) \tag{18}$$

$$= (\mu^\lambda(s) - \mu^\lambda(r))\sigma(\omega(\mu^\lambda(s) - \mu^\lambda(r)))$$

where $\sigma(x) = (1+\exp(-x))^{-1}$ and ω is a positive constant. Finally, given a set of truth values $\eta^\lambda$ of predicates referred to a given stimulus, the saliency of the set is $$F(\eta^\lambda) = \sum_\lambda \eta^\lambda \tag{19}$$

The measurements s belong to the feature space F. It will be convenient for a while to work on a different space: the predicate space M. The predicate space is an m-dimensional manifold (where m is the number of predicates) which is a subset of $IR^m$. It is related to F by the relation:

$$\Xi: F \to M: s^i \to \mu(A_i^\lambda s^i) \tag{20}$$

With the membership function $$\mu(x) = \alpha(x) \tag{21}$$

M is an open subset of $IR^M$ whose closure is the unit cube $[0, 1]^m$. Moreover, M is diffeomorphic to F, and hence it is an m-dimensional submanifold of $IR^n$.

Consider two measurements s, r∈F and the truth values of the predicates based on those measurements: $\pi = \Xi s$ and $\eta = \Lambda r$. Then, in M, the Tversky distance between π and η is given by Reference Santini 97a:

$$T(\eta, \pi) = \Theta \sum_\lambda \eta^\lambda + \gamma \sum_\lambda (\eta^\lambda - \pi^\lambda)\sigma(\omega(\eta^\lambda - \pi^\lambda)) + \tag{22}$$

$$\beta \sum_\lambda (\pi^\lambda - \eta^\lambda)\sigma(\omega(\pi^\lambda - \eta^\lambda))$$

$$= -P(\eta; \theta) + M(\eta, \pi; \lambda, \beta)$$

with $\gamma = \alpha + \beta$.

The term P will be called the "saliency" of the reference stimulus η, and the term M the "distance" between η and π. The term P depends on the reference stimulus only. We have already noted that in many psychological experiment there is an asymmetry in the roles of the two stimuli that the subject must compare. The typical experimental question is "how similar is s to r?" Where $\Xi r = \eta$ and $\Xi s = \pi$. This term is absent when the request does not emphasize any stimulus. Requests like "how similar are s and r?" have P=0.

The term P is interesting from a psychophysical point of view. Reference Tversky 77. However, it does not influence the relative judgment ("what is more similar to r, s or t?") and therefore is not very interesting in the context of perceptual databases based on similarity.

M is the distance in the predicate space M, and it endows M with the structure of a Riemann manifold. The distance can be written as the integral of the function $$\phi(\tau, \tau) = \sum_\lambda m_{\gamma,\beta}(\omega\tau^\lambda)\tau^\lambda \tag{23}$$

over the curve joining $\zeta_0$ and $\zeta_1$. Reference Santini 97a. This expression holds if it is assumed that the curve is traced in the positive direction of the parameter. This expression doesn't give a distance, yet. The inventors have considered going through the geodesic in one direction only and, as a result, have obtained a function whose integral along a closed curve is zero. The inventors correct this by postulating the behavior of the distance function on curves other than the geodesic. It is done in such a way that:

$$\Phi(\tau, \lambda\xi) = |\lambda| F(\tau, \xi) \tag{24}$$

holds. This can be done by defining:

$$\Phi(\tau, \tau) = \sum_\lambda |m_{\gamma,\beta}(\omega\tau^\lambda)\tau^\lambda| \quad (25)$$

This will not change the distance function of the invention along a geodesic, but will make Φ comply with the requirements for a metric.

The space M is not very interesting. The inventors find it much more interested in discovering how similarity is obtained based on the features of the image, that is, the inventors are interested in the geometry of the perceptual space F. The spaces F and M are related via the diffeomorphism Ξ and, through Ξ, the metric in M induces a metric in F.

Remember that, in the case of the invention, Ξ is defined as $$\Xi s^i = \eta^\lambda = \sigma(A_i^\lambda s^i) \quad (26)$$

This relation between F and M induces a relation between the metric Φ and the metric F of the feature space. In particular, the metric Φ is pulled back to F(z, s), with $$F_y(z, s) = \sum_\lambda |m_{\gamma,\beta}(\mu(A_i^\lambda z^i) - \mu(A_i^\lambda y^i))\mu'(A_i^\lambda z^i)A_i^\lambda s^i| \quad (27)$$

where y is the reference stimulus, z the stimulus we are comparing to y, and s the tangent to the geodesic joining them. Note that the function Φ in the predicate space was a function of the difference between the coordinate of the stimulus and those of the reference (namely, it was a function of $\pi^\lambda - \eta^\lambda$). In this case the functional dependence on the reference y is more complicated. So much, in fact, that it can be said that F is a function of the absolute coordinates of the stimulus z parameterized by the reference y.

This fact has a very interesting and intriguing interpretation: the perceptual space is deformed by the presence of the reference y!

Similarity measurement can be explained as a distance function, but it must be admitted that the presence of a reference influences the geometry of the perceptual space. The effects of this assumption are easily seen in similarity experiments. When in an experiment we ask a subject "how similar is A to B?" the subject tends to concentrate more on the features of B than on those of A. It is this concentration on the features of B that determined the shape of the perceptual space. It is significant that certain effects, like the asymmetry of the similarity, are much less pronounced when subjects do not focus on any of the two stimuli (that is, when there is no reference), as is the case when the question is phrased: "how similar are A and B?"

4. Interfacing with a Database

In the perceptual database of the present invention a query is composed of similarity measures and "logic" operators. Reference Santini 96c. A similarity measure is based on one reference image (the "referent") and one similarity criterion. A similarity measure labels each image in the database with the distance from the referent as measured by the given similarity criterion. Logic operators take in input two lists and produce a third one in which the label of image $I_k$ is a function of the labels that $I_k$ has in the two inputs.

More formally, the output of every operation is a list of images and labels $$\{(I_i, d_i), d_i \in \mathfrak{R}^+, i=1, \ldots, N\}$$

A similarity measure has a reference image I and a distance function δ: I×I→$\mathfrak{R}^+$, where I is the set of database images, defined by the similarity criterion. The output of the similarity measure is the list $$\{(I_i, \Delta(I, I_i)), i=1 \ldots, N\}$$

A logic operator has a function [ $\mathfrak{R} \times \mathfrak{R}$ =$\mathfrak{R}$ $^+$ and, if the operator receives in input the lists $(I_i, d_{i1})$ and $(I_i, d_{i2})$, its output is $$\{(I_i, [(d_{i1}, d_{i2})), i=1 \ldots, N\}$$

A more detailed explanation of the query definition process can be found in reference Santini 96c. Logic operators can be cascaded to create complex queries. We give the following definition of a query:

A similarity query is a labeled Directional Acyclic Graph (DAG) G=(U,E), with U=$U_m \cap U_r$ being a partition of the vertices.

Node u has $I_u$ incoming edges, $O_u$ outgoing edges, and a label (λ[u], ι[u]), with λ[u]∈{m,r}, and ι[u]∈IN$^+$. The graph has the following four (4) properties:

1. The partition U=$U_m \cap U_r$ is such that, for all u∈U, $$u \in U_m \Leftrightarrow \lambda[u] = m$$

$$u \in U_r \Leftrightarrow \lambda[u] = m$$

2. For all u∈U, and (u, v)∈E, it is v∈$U_r$.
3. ∀∈$U_r$: |I(u)|=ι[u], and ∀u∈$U_m$: I(u)=0
4. There is exactly one node such that O(u)=0.

The first property states that the graph is partitioned into measures and logic operations, and that the label λ[u] distinguishes between the two. The second property states that the output of a node always goes to a logic operation. (This definition is slightly simplified with respect to the definition given in reference Santini 96c. In that definition it was possible that the output of a relation be connected to the input of a measure. This had meaning only as a query optimization device, and needs not to concern us here.) The third property states that each logic operation has exactly the number of inputs predicted by the label ι[u], and that each measure has no inputs. Finally, the last property singles out one specific node of the graph which has no output connections and that will be called the result node.

The definition of the query as a graph naturally leads to the definition of a graphical interface. The graphical interface of the visual navigation system of the present invention is shown in FIG. 1. The work area shown at the left side of the figure is used to compose the interface by placing icons representing the measures and the logic operators, and by connecting them. The area in the upper right corner of the figure is used to select the available measures and operators, and the area in the lower right corner of the interface is a browser that displays the results of the query.

In the preferred implementation four similarity criteria are used: 1) color, 2) color distribution, 3) structure, and 4) fine structure. Measures are put together using six operators: and, or, not, and three more operators which are labeled E1, E2, and E3 in FIG. 1 and which are used for experimenting with new operators. The button labeled "Nav" is the navigator, that will be described in the next section.

FIG. 1 displays a query in which we ask images similar in color and structure to the first image displayed in the browser (the referents of the measures are not visible in FIG. 1) , and the results of this query.

5. Navigating in a Database

The basic interface that was seen in the previous section 4. displays the results of the query in a browser from which the user can select an image either as the final result of the query or for further interaction. This is a very primitive interface, and one which masks a lot of information from the user. One major problem is that the geometric nature of the space in which similarities are measured is lost. According to the model of the invention presented in section 1, images are immersed in a Riemann space whose characteristics depend on the particular query and referent(s). The way images are arranged in the perceptual space gives us a lot of information about their relationships, but this metric information is lost in the browser interface described in the previous section. The only information that survives in the browser is the ordinal relation among the images; the metric and topological information is lost.

The importance of maintaining the metric relations can be illustrated by the following example: suppose you have just asked a simple query, let's say all the images similar in color distribution to the British Union Jack. The database returns a couple of flags, two other similar things, and then something completely different. You are very unhappy about this, and start wondering what might have happened. One possible explanation is that there is nothing wrong with the query, but simply that there are only four elements in the database that resemble the Union Jack. In this case, the four elements resembling the flag will be relatively close to the query, while all the other elements will be fairly distant, and will appear in the answer only because there was nothing better to show.

The simple browser that we have attached to the query interface does not give us any indication in this sense, since the information we need is inherently metric and, as we have seen, the browser hides metric information.

Figure 2B:
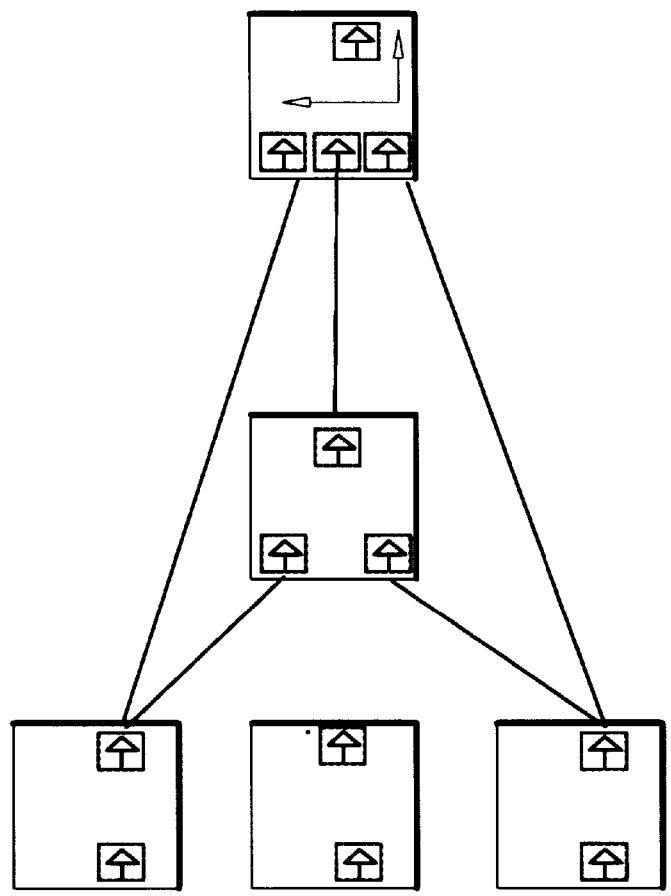
FIG. 2 is a diagram of the user screen during the user specification of three different queries as input to the visual navigation system (for perceptual databases) of the present invention, the query screen for which was previously seen in FIG. 1.
Figure 2A:
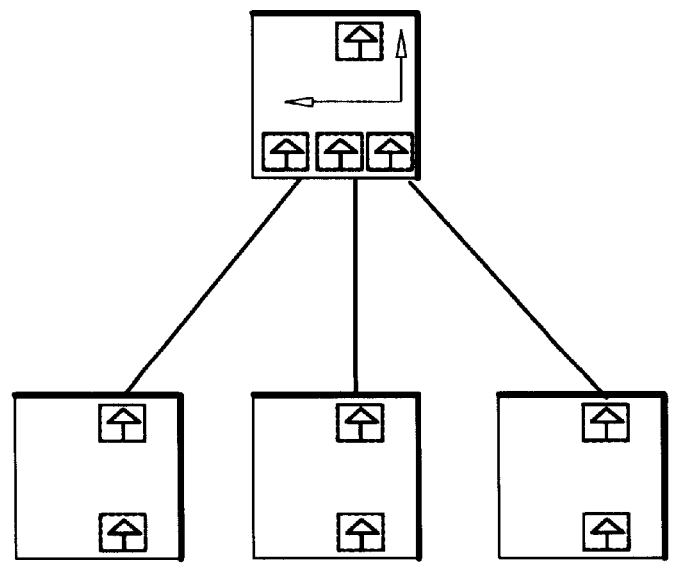
Figure 3:
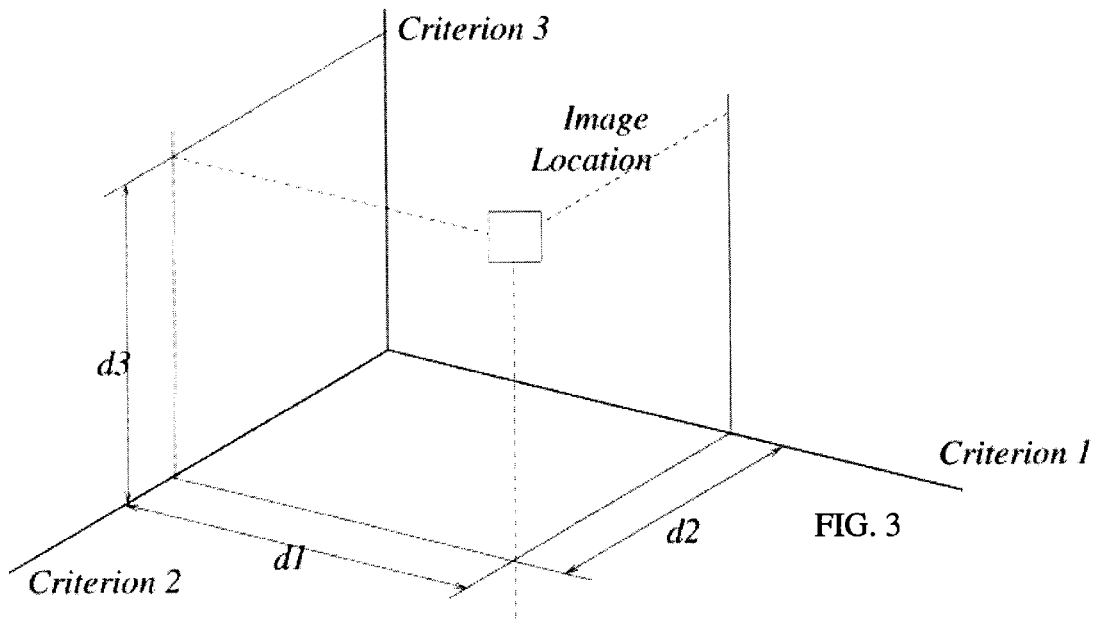
FIG. 3 is a diagram showing that the position of an image in the display space of the visual navigation system (for perceptual databases) of the present invention is determined by its distances with respect to three similarity queries.

An expanded and extended interface is based on the idea of letting the user navigate into the results of the query. The navigator interface is a three-dimensional compact subset of $\mathfrak{R}$ (actually: a cube). The navigator is started from the query interface by specifying three different queries as inputs (see FIG. 2). The images are arranged in the display space in a way that reflects the geometric relationships induced by the three queries that compose the input of the navigator (FIG. 3): the coordinates of an image in the display space are the distances induced by these three queries.

Figure 4:
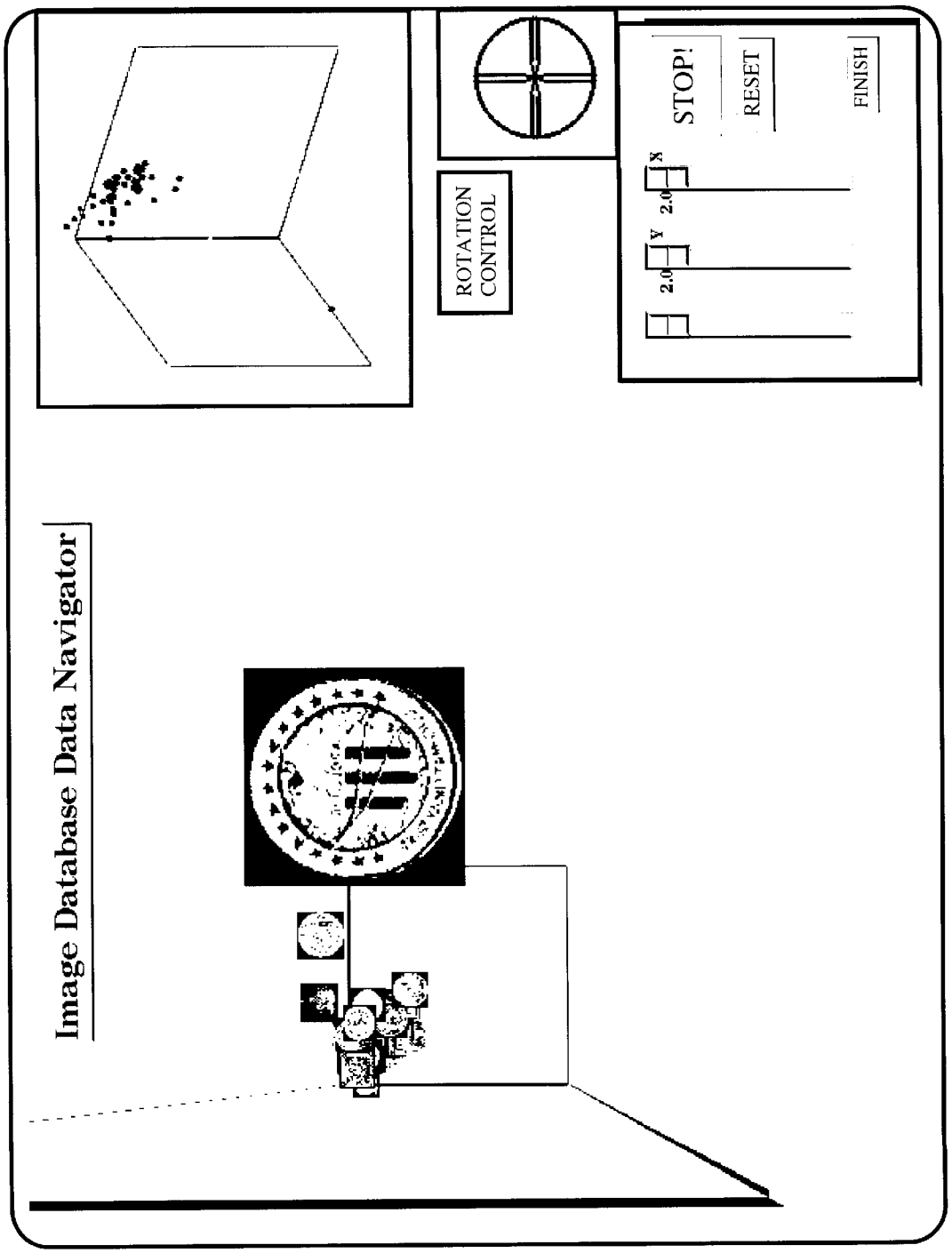
FIG. 4 is an overall user screen view of the navigator and its controls in the visual navigation system (for perceptual databases) of the present invention (as was previously seen in FIGS. 1–3).

The compactness of the perceptual space ensures that the display space is also compact. In particular, with the measures we use, the closure of the display space is the unit cube in $E^3$, the three-dimensional Euclidean space. The metric properties of the display space depend on the input queries. An overall view of the navigator is shown in FIG. 4. The large panel shown at the left is the representation of the display space in which the user navigates; the commands on the bottom right portion of the interface are used for navigation, and the upper right portion of the interface contains an outside view of the space with the indication of the current position of the observer.

Figure 5:
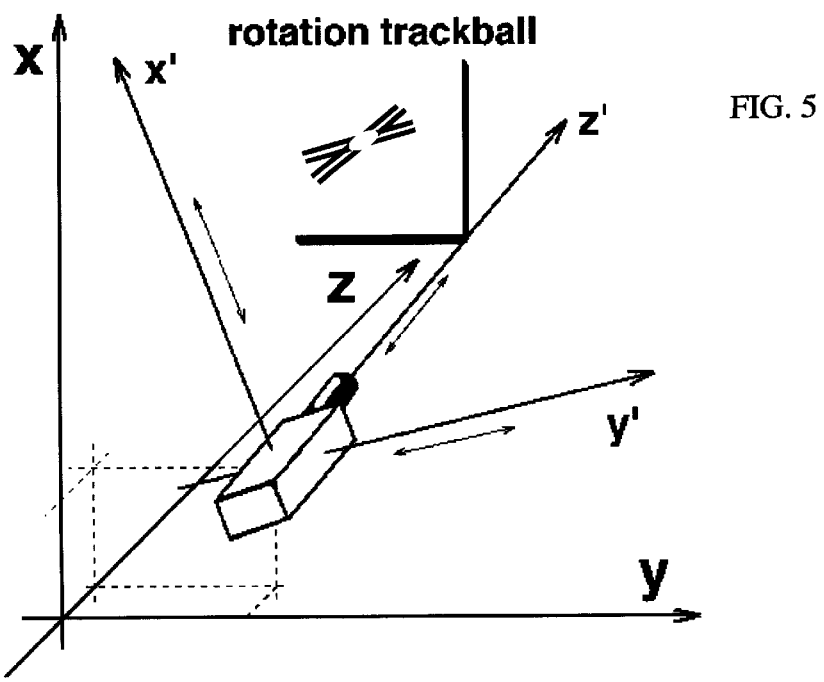
FIG. 5 is a diagram showing the relation between the observer coordinate system (x', y', z') and the space coordinate system (x, y, z) in the screen display of the visual navigation system (for perceptual databases) of the present invention.

The user starts at position (0, 0, 0) (if the three input queries have the same referent, this will be the location of the referent in the display space) and can translate at a certain speed (controlled with the speed gauges) along the three axes, and rotate the direction of gaze. The rotation trackball controls the rotation of the observer coordinate system with respect to the fixed coordinate system of the display space, while the sliders control the speed of translation along the axes of the observer coordinate system, See FIG. 5. The rotation trackball causes the camera to rotate.

The navigation window is a representation of a space with a geometry determined by the particular queries that have been input. It is important to give the user as good a "feeling" as is possible of the geometry of this space. Part of the feeling is given by the images themselves: if we assume that the features are uniformly distributed, then the images will be more concentrated in areas where the metric tensor is small. Typically, a large part of the cube will be occupied by images similar to the query while the images farther away from the query will in general be concentrated at the borders of the space. (The term "similar to the query" must be intended with a certain openness of mind. If we consider a simple query, then "similar to the query" means just similar to the referent with respect to the similarity criterion used in the query. If we consider a query composed by several criteria but with respect to a single referent, then we can still give it a geometric meaning in terms of a distance from that referent. In the general case, the term "similar to the query" will just refer to those images which received a low score.) The exact details of this depend, of course, on the nature of the metric in the perceptual space, as well as the nature of the query, but it is true for all measures preferably used and for most of the queries.

Another way to give the user a feeling of the geometry of the space is to adapt the velocity of its motion to the local geometry so as to create a kinetic, in addition to a visual, experience of the space. The cube displayed on the screen is a projection of the perceptual space that, although contained in the unit cube in the Euclidean space, is, according to its own metric, unlimited. Therefore, an observer moving at constant speed towards the border of the cube will never reach it. When we project the moving observer into the three-dimensional Euclidean cube, the uniform speed at which the observer travels is not uniform at all, but it will decrease as he approaches the border and, in general, it will be a function of the local metric of the display. Consider a user that, in its own coordinate system, moves at a speed $v^i$ along the i-th dimension (i=1, . . . , 3). Then, if the metric tensor of the display space is $g_{ij}^d$, then the projected image of the observer will move at a speed $$\left[\sum_{ij} g_{ij}^d v^i v^j\right]^{\frac{1}{2}} \tag{28}$$

The speed depends on the metric of the display space, $g^d$ which, in turn, derives from the metric of the perceptual spaces of the three input queries. It is important to remember that the perceptual space is a high dimensional space in which the image features are. The metric of the perceptual space is a metric in this high dimensional space and is a function of the referent and of the particular query. The display space, on the other hand, is a three dimensional space, with one different query attached to each one of its three dimensions. Therefore, in a sense, each of the three dimensions of the display space somehow encode the metric of one of the three perceptual spaces it has in input.

It is possible to generate a metric for the display space directly from the metric of the perceptual space (the former can be considered as a projection of the latter) but this is in general very complicated and time-consuming: the metric of the display space should be recomputed for every query, since it would depend on the particular query and on the referent. This solution seems also rather an overkill, being used only to control the speed of translation in the display space. A simpler alternative is to consider that, if features are uniformly distributed in the predicate space, then images will tend to be more dense in areas in which the metric is small. Based on this assumption, we can consider the projections of the image position on the three axes, and derive three probability distributions: $\rho_i(x^i)(i=1, \ldots, 3)$. Then, one possible metric tensor for the display space is $$g(x, y, z) = \begin{bmatrix} \rho_1(x)^2 & 0 & 0 \\ 0 & \rho_2(y)^2 & 0 \\ 0 & 0 & \rho_3(z)^2 \end{bmatrix}$$

which yields an Euclidean-type space, or $$g(x, y, z) = \begin{bmatrix} \rho_1(x)^2 & 2\rho_1(x)\rho_2(y) & 2\rho_1(x)\rho_3(z) \\ 2\rho_1(x)\rho_2(y) & \rho_2(y)^2 & 2\rho_2(x)\rho_3(y) \\ 2\rho_1(x)\rho_3(z) & 2\rho_2(x)\rho_3(z) & \rho_3(z)^2 \end{bmatrix}$$

which gives a city-block type of distance. Using one of these metric to determine the translation velocity as in equation (28) enhances the perception of the geometry that the user obtains from navigation.

Figure 6:
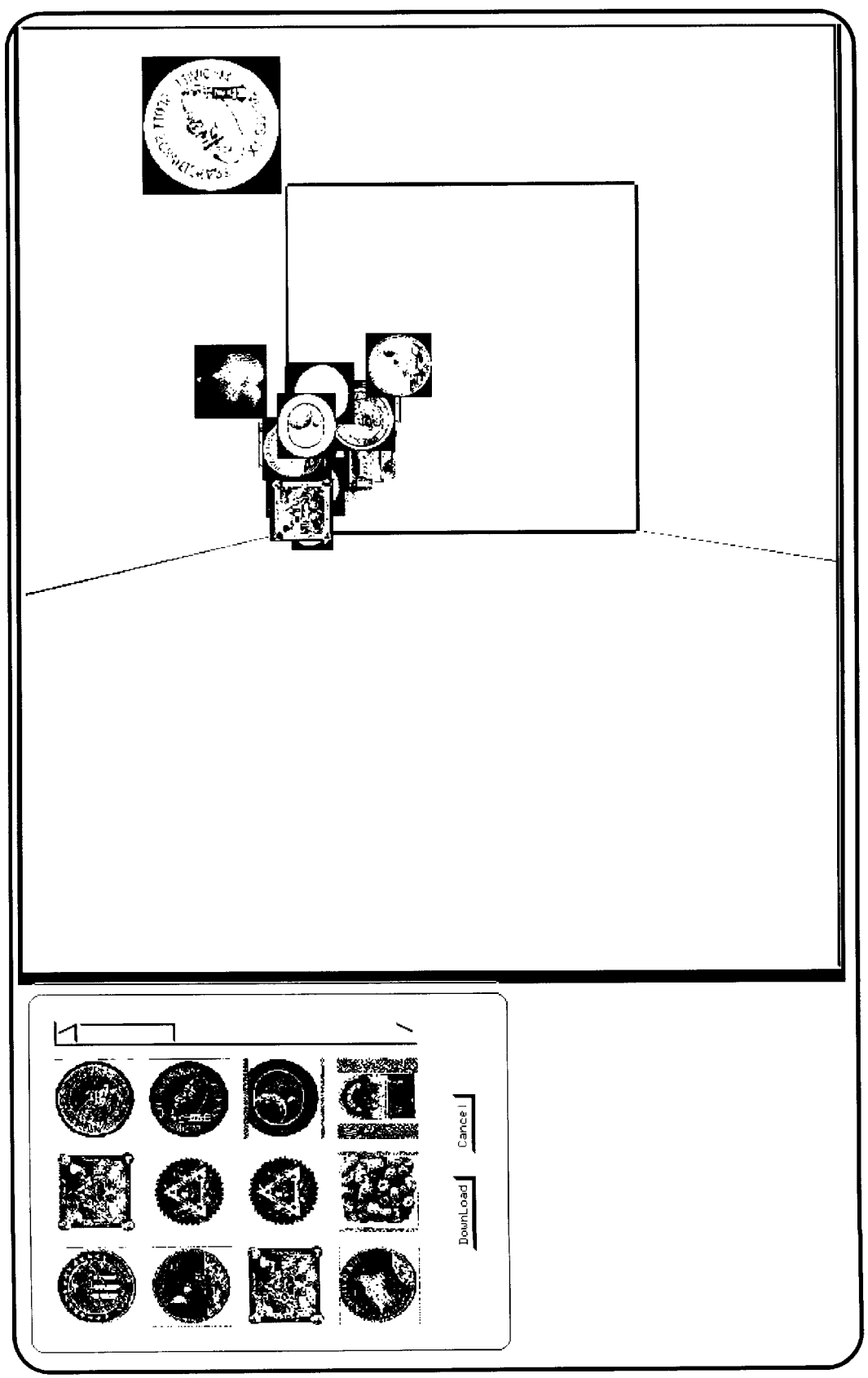
FIGS. 6–9 are "snapshot" views of the user display screen during operation of the visual navigation system (for perceptual databases) of the present invention.
Figure 7:
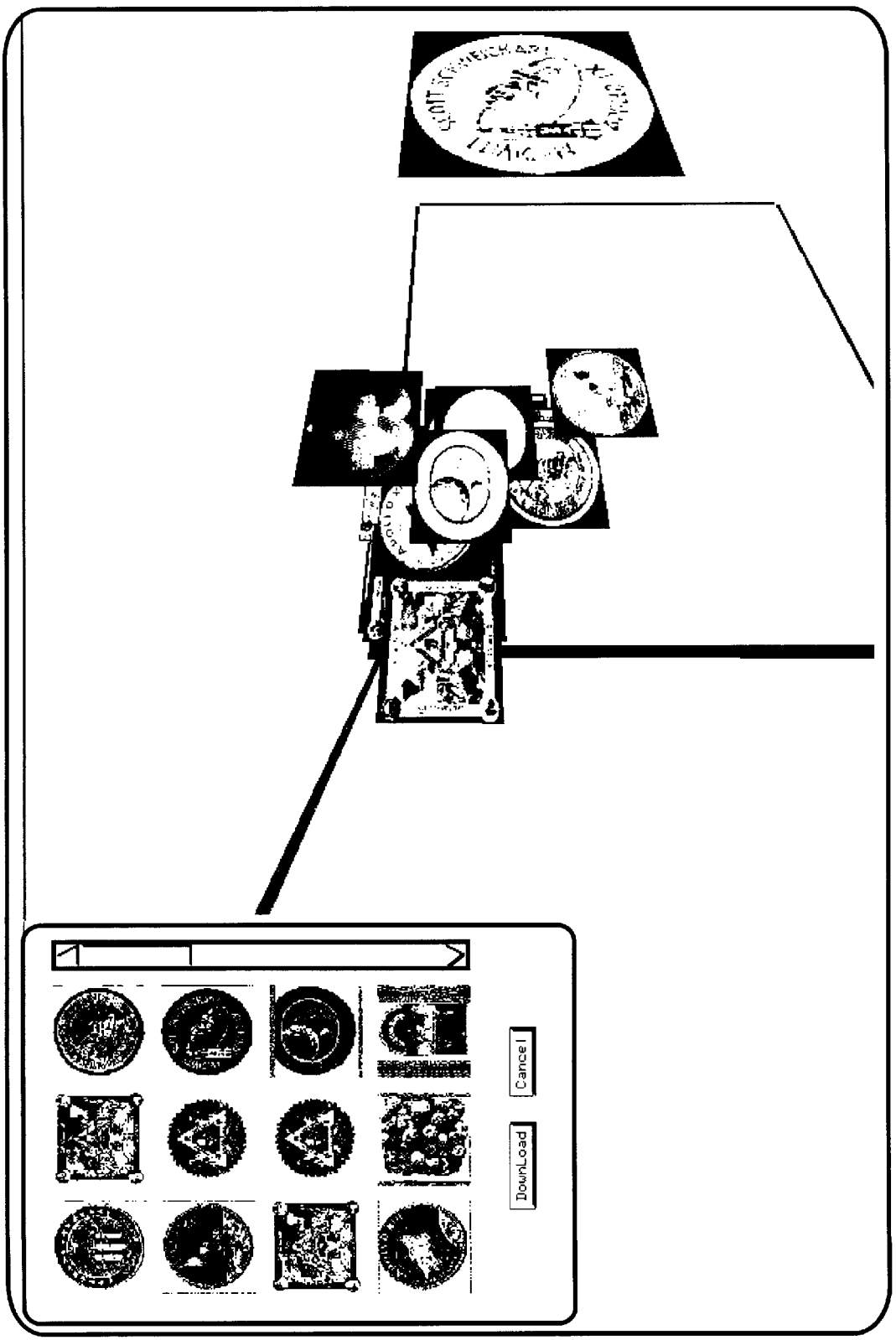
Figure 8:
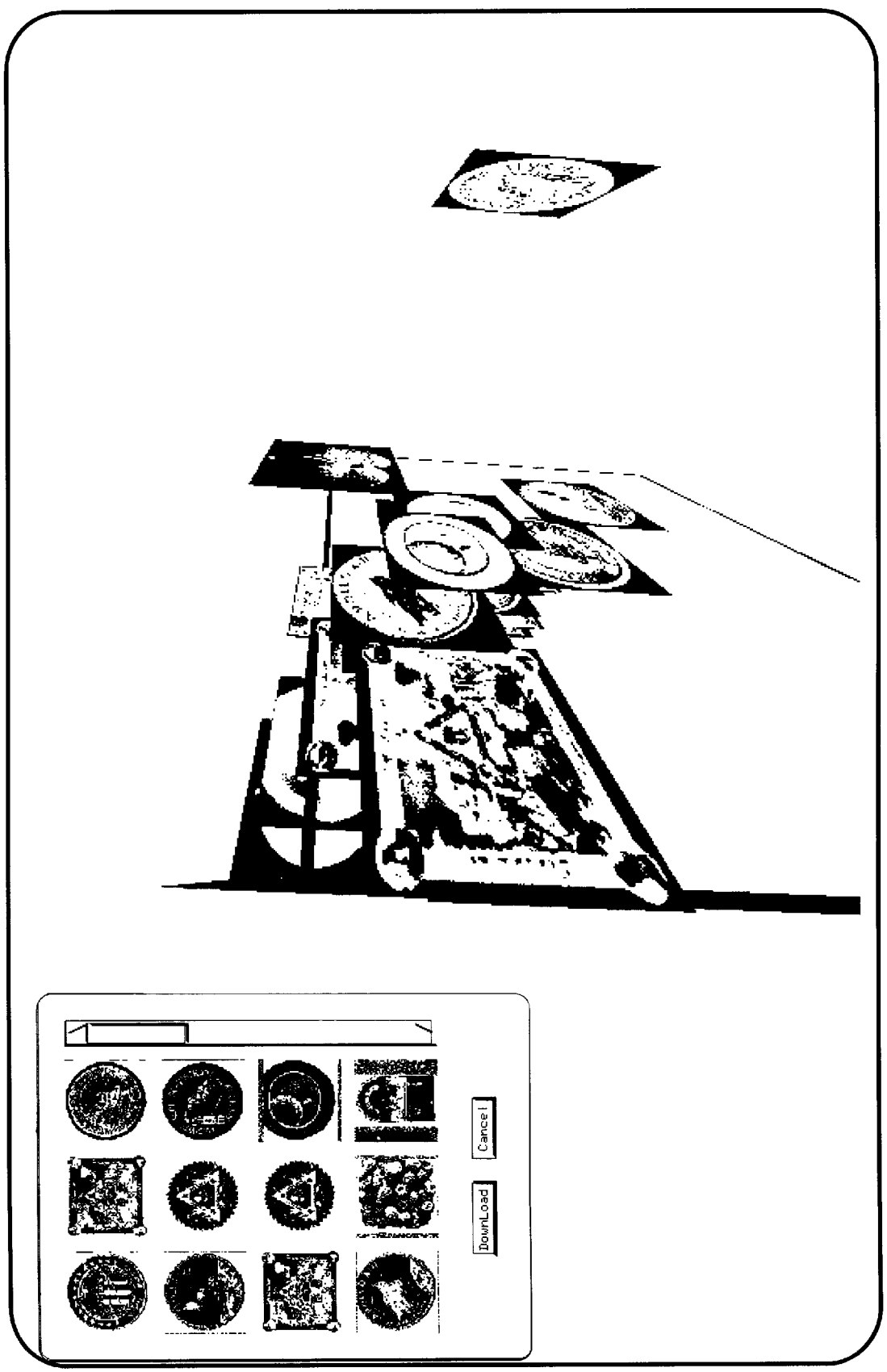
Figure 9:
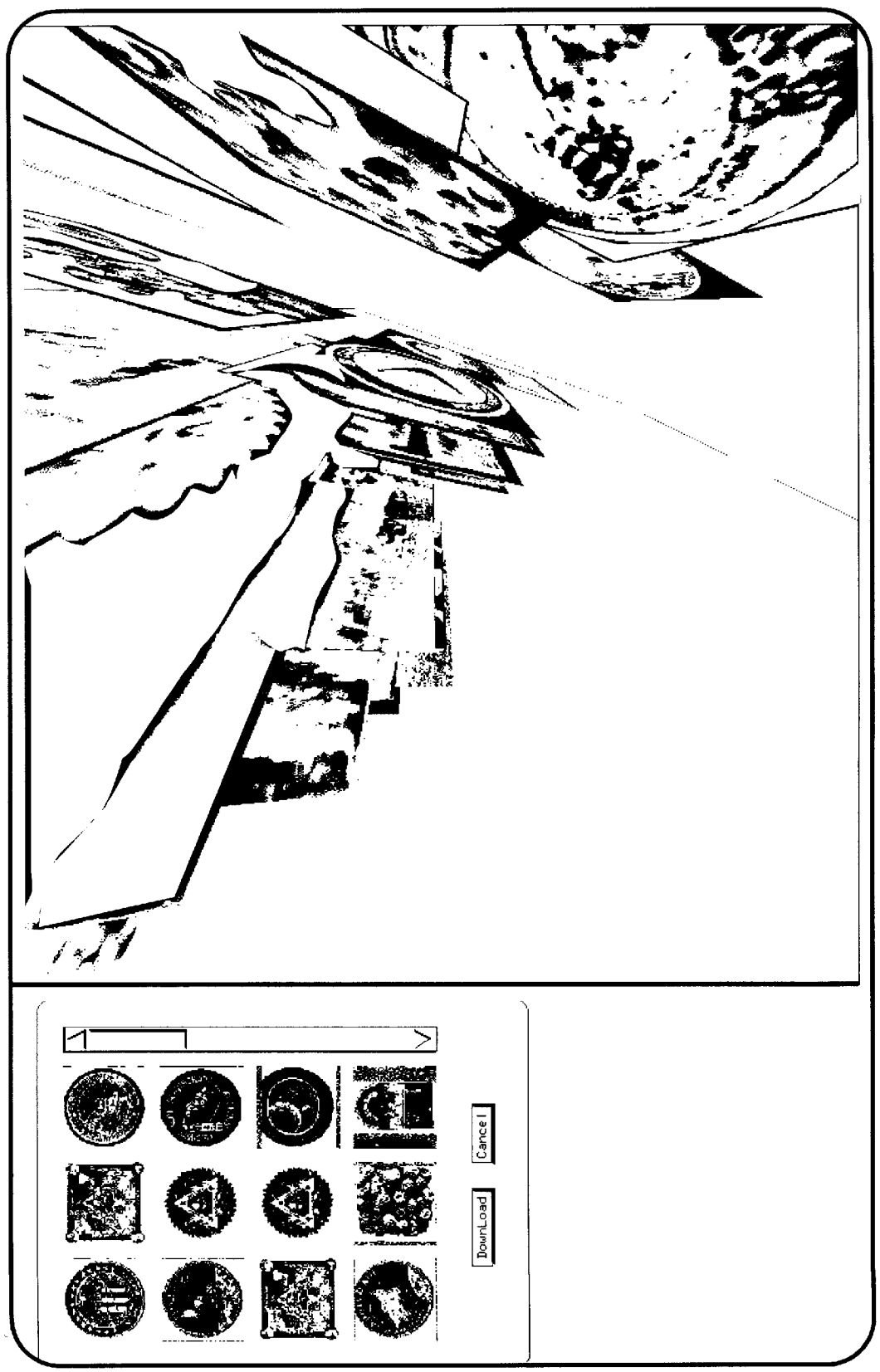

FIGS. 6 thorough 9 show snapshots of a typical navigation session. Besides the navigator, we show the result to the same query returned by the browser. Note that in the navigator the first image displayed in the browser (the image closest to the query) does not appear because, in the situation displayed in the images, we have navigated past it and it remains behind the camera.

Figure 10:
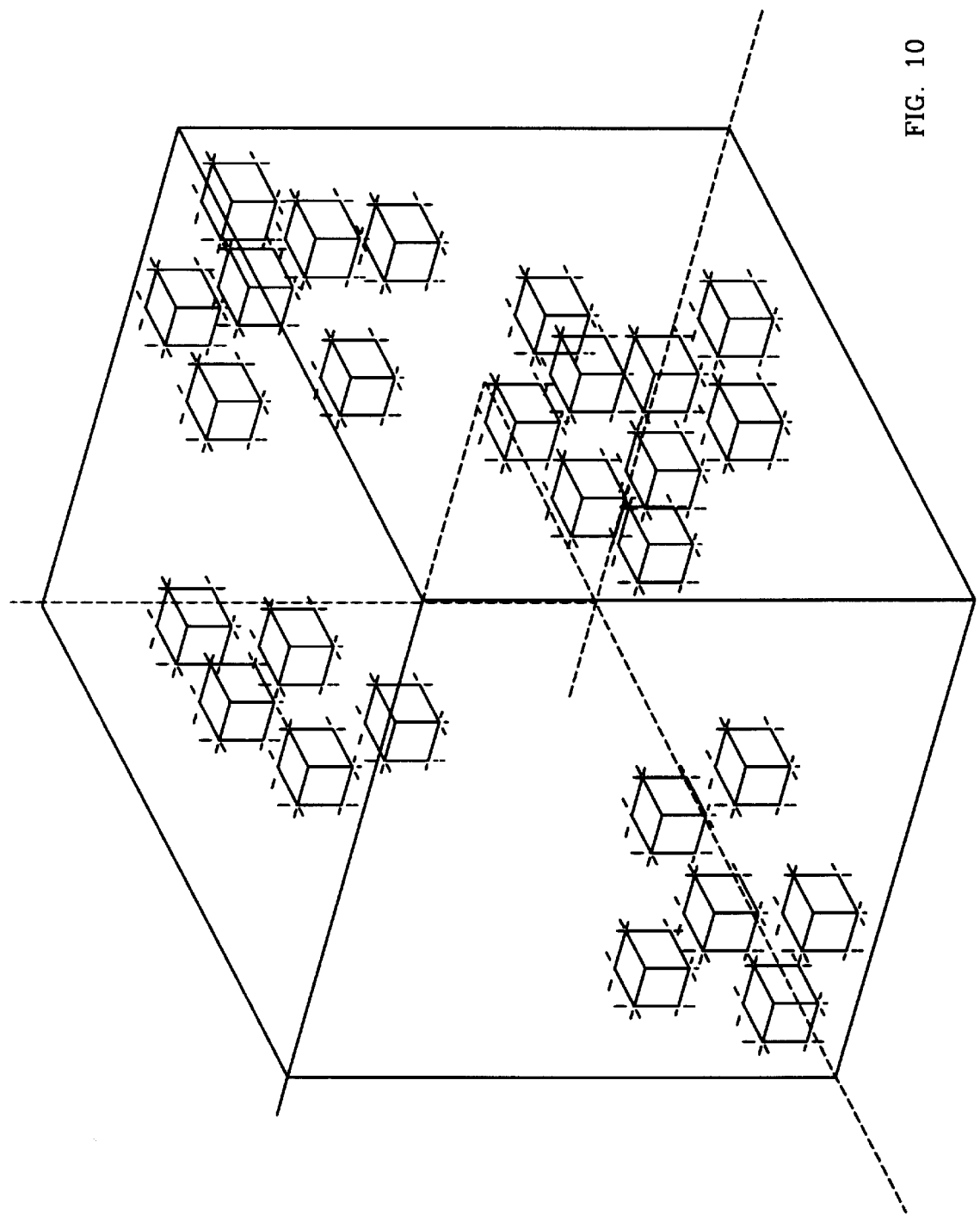
FIG. 10 is a diagrammatic representation of how, when images are displayed in the display space of the visual navigation system (for perceptual databases) of the present invention, the images may be manually- or machine-classified into groups in accordance with their coordinates.

Similarly, FIG. 10 is a diagrammatic representation of how, when images are displayed in the display space of the visual navigation system (for perceptual databases) of the present invention, the images may be manually- or machine-classified into groups in accordance with their coordinates. The images may in particular be grouped in accordance with their three-dimensional vector distances from the origin, or reference image, but other groupings are possible.

Figure 11:
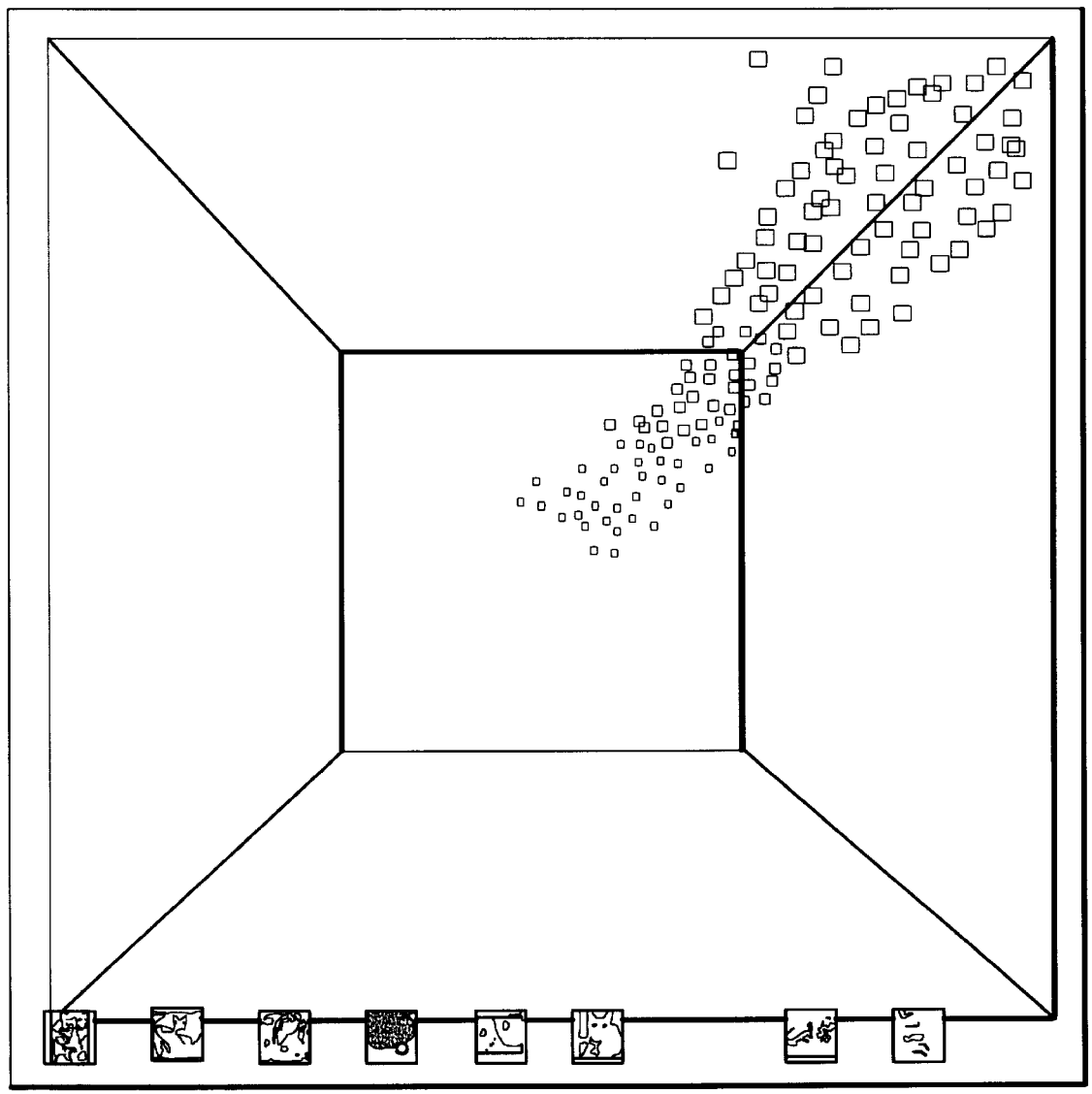
FIG. 11 is a "snapshot" view of a user display screen, alternative in amount of image content presented and in the particular manner of image presentation but equivalent in principle to the display screens of FIGS. 6–9, showing a great number of data objects located in a 3-D space relative to a reference object but with significantly fewer of these data objects visually displayed, and this in positions displaced, but related to, their coordinate positions.

A "snapshot" view of yet another a user display screen, alternative in amount of image content presented and in the particular manner of image presentation but equivalent in principle to the display screens of FIGS. 6–9, is shown in FIG. 11. In this screen great number of data objects are still shown located in a 3-D space relative to a reference object. However, significantly fewer of these data objects are directly visually displayed relative to, for example, the 100%, or near 100%, display of FIGS. 6–9. Moreover, those data objects visually displayed are not within the 3-D plot, which is crowded with many points at small scale, but are relocated to the bottom axis of the 3-D display "box".

The images therein display are, however, still in positions that are related to their 3-D coordinate positions. In particular, the reference image at the origin (i.e., the left front corner of the display "box") may be observed. The other images may be randomly, or periodically selected, or selected by some criterion or criteria. For example, the displayed images may be equidistantly separated along an axis that is not the axis presently to the fore, and by which axis the image data distribution (the numerous points) is presently being observed. The main point, as with the displays of FIGS. 6–9, is to observe whether the images as have been identified and ordered as being of increasing relevance/irrelevant to the reference data image either are, or are not, reliably so relevant/irrelevant. Sometimes seemingly incisive, and discriminatory, and deterministic search criteria will not, in the "end analysis" as is so clearly visible in FIG. 11 and other displays of the present invention, in fact provide the desired, "quality", search results. At other times search criteria that seem to be "off the wall" will prove to deliver results where data items of interest are quite well, and accurately, discriminated from data items of no interest.

The entire search, and re-search, process will be understood to be recursive, searching continuing until the desired degrees of any of (i) isolation/segregation between the data records, (ii) accuracy or ordering data records, (iii) comprehensive inclusiveness of desired data records (i.e., no "misses", and/or (iv) non-inclusion of undesired data records (i.e., no "false positives"), are achieved—or prove impossible to achieve.

Clearly quantitative measurements of the "quality of search" may be derived, and applied. It is a straightforward matter to quickly, visually, observe representative samples, if not entire isolated areas of the database as is displayed (reference FIG. 10), to determine to what degree the desired/undesired records are/are not being captured/excluded.

6. Conclusions

An image database system has been presented in which the traditional operation of matching is replaced by more general similarity measures based on simple sensorial impressions. The theory upon which our database of the present invention is founded assumes that the similarity measures are geometrical in nature although, in order to allow certain desirable characteristics, it is necessary to assume that the perceptual space is endowed with a Riemann metric more general than the usual Euclidean distance. In addition to this, the characteristics of the perceptual space in which distances are computed depend on the particular query that is being asked. The geometric aspects of the perceptual space are essential for understanding the relations between images. Traditional interfaces are based on the idea of a browser, which does not lead naturally to the intuition of the geometric properties of the space.

This specification has presented the essential theory of similarity-based image databases, and a new type of interface developed for navigation in a database of images has been described. The interface tries to capitalize on the geometrical nature of the perceptual space. It defines a display space, whose metric is derived from the metric of three perceptual spaces given as input to the navigator. The display space is displayed as a subset of the three dimensional Euclidean space that, for many of the distance functions we use, is contained in the unit cube. The metric inside this space is derived from the metrics of the navigator inputs. The perceptual intuition of the metric is given in part by the distribution of images in the space and in part by making the motion of the user uniform with respect to the metric of the space.

Compared with traditional browser interface, the navigator gives the user much more information about the relationship between images. Information is given in a geometrical form that makes it easy for the user to have an "intuitive understanding" of the organization of images in the database. In addition to this, the geometry of the space depends on the query that the user made so, looking at the overall organization of the display space, the user can also have an intuitive understanding of the characteristics of the query, and of how the query should be modified if the results are not satisfactory.

In accordance with the preceding explanation, variations and adaptations of the visual display system for perceptual databases in accordance with the present invention will suggest themselves to a practitioner of the computer and computer programming arts and sciences. For example, searching and ordering may transpire in many more than three criteria, and associated dimensions. It is simply the case than only three dimensions (really only two on a flat screen display) are readily susceptible of display, and visual analysis, at one time. For example, once the power of the present invention in juxtaposing imagery with search results is recognized, it is a straightforward matter to locate the images in various deviant manners as, for example, FIG. 11 is to FIGS. 6–9.

In accordance with these and other possible variations and adaptations of the present invention, the scope of the invention should be determined in accordance with the following claims, only, and not solely in accordance with that embodiment within which the invention has been taught.

What is claimed is:

1. An image data presentation system comprising:
   a data store means for holding a multiplicity of images;
   an input means for permitting an operator to query the multiplicity of images;
   a computer means for ranking the multiplicity of images that are within the data store means in response to a query received from the input means on the basis of preattentive similarity, meaning that the multiplicity of images are endowed with a metric structure, rising from the query, so as to create a Riemann manifold of N dimensions A, B, C, . . . L, M, N within which Riemann manifol the multiplicity of images are ordered so as to preserve information about their relationships; and
   a display means for displaying in three dimensions the ranked images within the N-dimensional Riemann manifold as (i) a perceptual space having a three-dimensional geometry X, Y, and Z in accordance with some arbitrary three dimensions B, E and H of the metric of the Riemann manifold, with (ii) the ranked images being located within the X, Y and Z coordinates of the three-dimensional perceptual space in accordance with their ranked relationships in the arbitrary three dimensions B, E and H;
   wherein the relationship of the displayed images is, at least insofar as regards the X, Y and Z metric of the three-dimensional geometry of the three-dimensional perceptual space, made visible, the images being both (i) located in the perceptual space in accordance with their properties in the arbitrary three dimensions B, E and H of the N-dimensional Riemann manifold, and (ii) located elative to one another in accordance with the similarities or distinctions of these properties.

2. The image data presentation system according to claim 1
   wherein the input means is further for permitting an operator to navigate among the images displayed within the perceptual space;
   wherein the computer means is dynamically re-ranking the images in accordance with navigational inputs received from the operator via the input means; and
   wherein the display means is presenting the re-ranked images dynamically;
   wherein the operator adds a kinetic experience to the visual presentation of the geometric organization of the images.

3. An image database system responsive to a user query for displaying selected images best satisfying the query out of a great multiplicity of stored images characterize in that
   conventional matching between stored images in response to the user query is replaced by more general similarity measures based on (i) simple sensorial impressions that are accorded the user (ii) in a three-dimensional perceptual space (iii) endowed with a Riemann metric that is more general than is the usual Euclidean distance;
   wherein (i) simple sensorial impressions simply means that the user can see or otherwise sense the selected images;
   wherein (ii) in a three-dimensional perceptual space simply means that the selected images which accord the user the simple sensorial impressions are within a three-dimensional Euclidean space, or volume;
   wherein (iii) endowed with a Riemann metric simply means that the three-dimensional perceptual space is ordered, and thus the selected images displayed therein are sensed by the user to be ordered in accordance with their properties in each of three display dimensions, corresponding to three dimensions of the Riemann metric as were relevant to the query;
   wherein the user does not merely sense the selected images, but further senses the relationship between and among the selected images within the three-dimensional perceptual space, and in accordance with the Riemann metric with which the three-dimensional perceptual space is endowed;
   wherein three-dimensional geometric aspects of the displayed three-dimensional perceptual space permit the user to understand relation between the displayed images in three different dimensions of the Riemann manifold at the same time, and not merely the presence or absence of any one of the great multiplicity of images.

4. The image database system according to claim 3 further characterized in that
   distances in the perceptual space are computed dependent upon a particular query that is being asked.

5. A man-machine interfacing method for permitting a machine user to navigate in a database of visual images, to navigate meaning to come to learn and to see and to know not merely the visual images that are within the database but also relationships between and among these visual images, the method comprising:
   classifying a database of visual images in accordance with an N-dimensional metric of the images, each dimension A, B, C . . . L, M, N of the database's metric being defined by the user as input to the machine;
   displaying a subset of the visual images that are classified in the N-dimensional database in a three-dimensional Euclidean display space that is contained in a unit cube, the three-dimensional unit cube having axes X, Y and Z corresponding to some arbitrary user-selected dimensions B, D, G of the N-dimensional database;
   wherein the metric inside the display space is derived from the user inputs as to both the dimensions A, B, C . . . L, M, N of the database, and also as to the particular arbitrary dimensions B, D, G of the database that are displayed along axis X, Y and Z;
   populating the three-dimensional display space with visually perceptible images from the N-dimensional data base of images, each image being located in X, Y and Z coordinate locations of the three-dimensional display space in accordance with the B, D and G metrics of the image; and
   permitting the user, by further input in the nature of movement of a computer mouse, to visually navigate among the displayed image in the three-dimensional display space;

therein by the permitted visual navigation the user may come to know both (i) the images that are within the database and the relationships among and between these images, at least for the metrics currently displayed within the three-dimensional display space, which metrics were derived from the user's own inputs, and, also, (ii) the suitability of the chosen metrics, which metrics were defined by the user as input to the machine, to reveal relationships among and between the images.

6. A man-machine interface method of recursively interacting with a database containing object records having a multiplicity of attributes to the end of (i) interactively developing particular criterion or criteria, out of multiplicity of criteria, by which (ii) a plurality of object records that have attributes that are, by particular finally-developed criterion or criteria, closest to a reference object record may best be identified, the method comprising the steps of:

manually selecting three criterion corresponding to an associated three or more attributes possessed by object records having a multiplicity of attributes that are located within a machine database;

searching and ordering with the machine the object records of the machine database in accordance with each of the selected three criterion;

displaying with the machine the results of the searching and ordering in a three-dimensional plot with each of the three criterion serving as a metric of an associated one axis and with each object record plotted, each in accordance with its attributes, relative to each axis, the attributes of a reference object record being at the origin of the plot;

manually observing a distribution of the three-dimensionally plotted and displayed object records in any of their locations, dispersion, or clustering in each ordinate axis of the display in order to recognize and to formulate one or more new criterion that might potentially be more advantageous for associating and for identifying selected object records closely corresponding to the reference object record than are a corresponding one or more of the old criterion by which the displayed object records are presently ranked and ordered;

recursively repeating the steps of manually selecting with the new criterion substituted for the old criterion, machine searching and ordering, machine displaying, and manually observing to formulate new criterion until, finally, the object records are three-dimensionally finally plotted and finally displayed in accordance with a finally-developed three criteria;

identifying from the final display those individual object records that are closest by the finally-developed three criteria to the reference object record, which reference object record is always plotted at the origin;

wherein the most telling three criterion and associated object record attributes to identity those individual object records closest to the reference object record may not have been known at the start of the process, but as the steps of the process are correctly recursively performed it is possible to draw out of the database of object records those object records that are truly close, at least in three criterion that are presumptively meaningful, to the reference object record.

7. The man-machine interface method according to claim 6 wherein the displaying is further of a visually perceptible attribute of at least some of the ordered, plotted, records;

wherein during the manually observing an observation of this visually perceptible attribute aids in the recognition and the formulation of the one or more new criterion.

8. The man-machine interface method according to claim 7 wherein the displaying of the ordered, plotted, records along with a visually perceptible attribute of at least some of these records is so that the visually perceptible attributes are co-located with the plotted records within the three-dimensional plot;

wherein association of any one plotted record with its associated visual attribute is itself visual, and unambiguous.

9. A method of displaying a multiplicity of object records, each of which object records is visually perceptible meaning that at least to some trained human eye a distinction of the object record when displayed from other object records likewise displayed is readily visually sensible, from a database of a great multiplicity of visually perceptible object records, the display method comprising:

selecting a plurality of criterion corresponding to an associated plurality of attributes possessed by each of a great multiplicity of object records, each having a multiplicity of object records of the machine database in accordance with the selected plurality of criterion;

displaying the results of the searching and ordering in a plot with each of the selected plurality of criterion lying along an associated one axis, with each object record being plotted along all axis in accordance with its attributes, and with an arbitrary object record being at the origin of the plot;

concurrently with the displaying of the plot, displaying at the same time at least some of the plotted object records in a manner in which these object records are both (i) visually perceptible, and (ii) positionally associated with the plot, any attributes of the object records that are so visually perceptible not necessarily being those that correspond to any of the plurality of the criterion of the plot;

wherein the displayed (i) plot, in combination with (ii) visually perceptible attributes of at least some of the plotted object records positionally associated with these at least some object records, permits a human to form an impression that those plotted object records that are located relatively more closely to, and relatively more distant from, the arbitrary object record along any one or more of the axes either are, or are not, coherently related one to another in their perceptible attributes displayed;

wherein if the human is given the impression that the at least some object records displayed are, along some axis or axes an at some location or locations of the plot, coherently related, then this means that object records within associated regions of the plot, whether ranked in accordance with the visually perceptible attributes or not, are likewise coherently related, meaning that the object records have likely been successfully (i) rationally ordered by (ii) some rational criteria of ordering;

wherein if the human is given the impression from the at least some object records displayed that there is no location of the plot where at least some object records are coherently related, then this does not conclusively mean that there are no such regions, nor any such attributes, but it does indicate that, at least for the perceptible attributes and for the at least some object records displayed, to the human the object records have unlikely been (i) rationally ordered by (ii) any rational criteria of ordering;

wherein the method is as much a test for the rationality of some criteria of ordering as it is a basis for ordering object records in accordance with some criteria.

10. A computer method of displaying digital images comprising:

ordering with a computer digital images in each of three criteria A, B, C each of which criterion A or B or C is perceptible to the human eye in the images should they be displayed;

defining with the computer a display space that is three-dimensional, with axes of criterion A and criterion B and criterion C, and endowed with a non-linear metric along at least one of the axes of criterion A or B or C, said non-linear metric simply meaning that mapping of an associated criterion to the at least one axis is, although in monotonic rank order, not so that equal differences in the associated criterion will map to equal distances along the at least one axis but that, instead, equal differences in the associated criterion will map to unequal distances along the at least one axis;

generating with the computer thumbnail images corresponding to each of the digital images;

displaying with the computer the generated thumbnail images in the defined three-dimensional display space in accordance with their ordering in each of the three criteria A, B, and C.

11. The method according to claim 10 further comprising:

scaling the displaying in accordance with input to the computer from a human viewer of the thumbnail images within the three-dimensional display space;

wherein at expanded scale the human viewer can better distinguish between individual thumbnail images.

12. The method according to claim 11 further comprising:

orienting he displaying in accordance with input to the computer from the human viewer of the thumbnail images within the three-dimensional display space;

wherein a differing angular orientations the human viewer can better distinguish which of the criterion A, B and C most, and least, pronouncedly separates the individual thumbnail images in aggregate, and in scaled regions of the three-dimensional display space.

13. A computerized method of generating and displaying a particular computer-user-navigatable three-dimensional computer-generated virtual-reality space, the method characterized in that visual perceptible elements in the form of separate detached images are displayed within the three-dimensional space where the displayed separate images are ranked and are located within the three-dimensional space in accordance with their individual values in each of three criteria A, B, and C that comprise the axes of the three-dimensional space, the three criteria A, B and C are each perceptible to a human viewer of the images that are displayed within the three-dimensional pace, and thus the separate images themselves are distinguishable one to the next as displayed, and a viewer of the displayed images can navigate among the displayed images and within the three-dimensional space in order to observe the ranking and locations thereof in accordance with each of the three criteria; while successive inputs from the viewer cause re-ranking and re-locating an re-displaying of the separate images in the three-dimensional space in accordance with successive new, viewer-specified, criteria, thus producing over time successive new three-dimensional spaces each with separate images displayed therein;

wherein by control of the criteria by which the images are displayed, the viewer of the displayed images may come, over time, to identify and choose criteria that are suitable to isolate particular images of interest from all other images.

14. An iterative man-computer method so that the man (i) may come to identify criteria useful individually or in combination or both to individually and in combination so as to find one or more sought-after images within a database of a great multiplicity of images unindexed at least by any criteria that is useful for the finding, and (ii) may use the criteria so identified to, ultimately, find the one or more sought-after images, the method comprising:

first manually inputting to the computer three criteria by which all the images within the database are to be ordered;

creating with the computer a three-dimensional display space having three metrics derived from the three criteria of the user;

displaying within the created display space thumbnail images of all the great multiplicity of images;

second manually inputting to the computer by movement of a computer mouse spatial data therein to cause visual navigation among the displayed thumbnail images in each and in all of the three metrics of the display space, the man noting which metrics seem relatively more effective to distinguish among and between the displayed thumbnail images in manners potentially effective to isolate the sought-after images and which metrics seem relatively less effective;

iteratively repeating, with new criteria manually derived from experience in the navigation, the first manually inputting, the creating, the displaying, and the second manually inputting until, ultimately, criteria are developed that permit, during the course of navigation to a man-selectable region of the image space, a finding of the one or more sought-after images.

* * * * *